US011398624B2

United States Patent
Evans et al.

(10) Patent No.: US 11,398,624 B2
(45) Date of Patent: Jul. 26, 2022

(54) LARGE-FORMAT BATTERY ANODES COMPRISING SILICON PARTICLES

(71) Applicant: TESLA, INC., Palo Alto, CA (US)

(72) Inventors: Tyler Evans, Broomfield, CO (US); Daniela Molina Piper, Broomfield, CO (US)

(73) Assignee: Tesla, Inc., Austin, TX (US)

( * ) Notice: Subject to any disclaimer, the term of this patent is extended or adjusted under 35 U.S.C. 154(b) by 118 days.

(21) Appl. No.: 16/340,823

(22) PCT Filed: Oct. 13, 2017

(86) PCT No.: PCT/US2017/056634
§ 371 (c)(1),
(2) Date: Apr. 10, 2019

(87) PCT Pub. No.: WO2018/071846
PCT Pub. Date: Apr. 19, 2018

(65) Prior Publication Data
US 2019/0267617 A1    Aug. 29, 2019

Related U.S. Application Data

(60) Provisional application No. 62/407,938, filed on Oct. 13, 2016.

(51) Int. Cl.
*H01M 4/36* (2006.01)
*H01M 4/04* (2006.01)
(Continued)

(52) U.S. Cl.
CPC ......... *H01M 4/364* (2013.01); *H01M 4/0404* (2013.01); *H01M 4/0471* (2013.01);
(Continued)

(58) Field of Classification Search
CPC .. H01M 4/364; H01M 4/0404; H01M 4/0471; H01M 4/133; H01M 4/134;
(Continued)

(56) References Cited

U.S. PATENT DOCUMENTS

| 4,710,436 A | 12/1987 | Nakamura et al. | |
| 2008/0305395 A1* | 12/2008 | Hirose | H01M 4/045 429/218.1 |

(Continued)

FOREIGN PATENT DOCUMENTS

| CN | 101222041 | 7/2008 |
| JP | 2005-285581 | 10/2005 |

(Continued)

OTHER PUBLICATIONS

International Search Report for Int. Appl. No. PCT/US2017/056634, dated Feb. 1, 2018, 2 pp.
(Continued)

*Primary Examiner* — Jimmy Vo
(74) *Attorney, Agent, or Firm* — Knobbe, Martens, Olson & Bear, LLP

(57) ABSTRACT

Large-scale anodes containing high weight percentages of silicon suitable for use in lithium-ion energy storage devices and batteries, and methods of manufacturing the same, are described. The anode material described herein can include a film cast on a current collector substrate, with the film including a plurality of active material particles and a conductive polymer membrane coated over the active material particles. In some embodiments, the conductive polymer membrane comprises polyacrylonitrile (PAN). The method of manufacturing the anode material can include preparation of a slurry including the active material particles and the
(Continued)

conductive polymer material, casting the slurry on a current collector substrate, and subjecting the composite material to drying and heat treatments.

19 Claims, 19 Drawing Sheets

(51) Int. Cl.
*H01M 4/38* (2006.01)
*H01M 4/587* (2010.01)
*H01M 4/62* (2006.01)
*H01M 4/133* (2010.01)
*H01M 4/134* (2010.01)
*H01M 50/411* (2021.01)
*H01M 4/02* (2006.01)

(52) U.S. Cl.
CPC ........... *H01M 4/133* (2013.01); *H01M 4/134* (2013.01); *H01M 4/386* (2013.01); *H01M 4/587* (2013.01); *H01M 4/624* (2013.01); *H01M 50/411* (2021.01); *H01M 2004/027* (2013.01)

(58) Field of Classification Search
CPC ...... H01M 4/386; H01M 4/587; H01M 4/624; H01M 50/411
See application file for complete search history.

(56) References Cited

U.S. PATENT DOCUMENTS

| | | | |
|---|---|---|---|
| 2010/0129711 A1* | 5/2010 | Kashiwagi | H01M 4/13 429/209 |
| 2012/0202117 A1 | 8/2012 | Hirose et al. | |
| 2013/0260239 A1 | 10/2013 | Lui et al. | |
| 2014/0011088 A1 | 1/2014 | Lopatin et al. | |
| 2015/0180020 A1 | 6/2015 | Komatsu et al. | |
| 2017/0179482 A1* | 6/2017 | Verbrugge | H01M 4/134 |
| 2017/0338474 A1* | 11/2017 | Lee | H01M 10/0525 |

FOREIGN PATENT DOCUMENTS

| | | |
|---|---|---|
| KR | 10-2008-0015160 | 2/2008 |
| WO | 2013/169605 A1 | 11/2013 |
| WO | WO 2016/070120 A1 | 5/2016 |
| WO | 2016/123396 A1 | 8/2016 |
| WO | WO 2016/123718 A1 | 8/2016 |

OTHER PUBLICATIONS

Piper et al. (2013) Conformal coatings of cyclized-PAN for mechanically resilient si nano-composite anodes. Adv. Energy Mater. 3:697-702.

Supplementary European Search Report dated Mar. 31, 2020 in PCT/US2017/056634.

\* cited by examiner

LARGE-FORMAT BATTERY ANODES COMPRISING SILICON PARTICLES

CROSS-REFERENCE TO RELATED APPLICATION(S)

This application claims priority to U.S. Provisional Patent Application No. 62/407,938, filed Oct. 13, 2016, the entirety of which is hereby incorporated by reference.

STATEMENT REGARDING FEDERALLY SPONSORED RESEARCH

This invention was made with government support under grant number DE-SC0013852 awarded by the Department of Energy. The government has certain rights in the invention.

TECHNICAL FIELD

This disclosure relates to energy storage devices such as lithium-ion electrochemical cells and batteries. More specifically, the disclosure relates to scalable production of silicon anode electrode sheets suitable for use in, e.g., lithium-ion energy storage devices and batteries.

BACKGROUND

Batteries have become ubiquitous in today's society, powering everything from hearing aids to smart phones, forklifts, and even vehicles. Today's battery technologies range from heavy, bulky, and inexpensive lead-acid batteries to lighter, smaller, and pricier lithium-ion batteries (LIBs). Rechargeable LIBs, though, have dominated the portable electronics market for nearly a decade, and recently they have gained significant traction in the electric vehicle sector and specialty markets including military applications. Slight improvements in materials processing and device manufacturing have allowed for an improvement in energy-density of approximately 5 to 6% each year, a slow and incremental development. To date, improvements in Li-ion technology have succeeded primarily in modifying first-generation materials and fitting them into smaller, safer packages. State-of-the-art batteries are still heavy, bulky, expensive, and unsafe, creating barriers to the next-generation application power/cost requirements. Reaching the future energy storage goals will require breakthroughs in next-generation electrode materials. Incorporating higher energy-density active materials is a necessity.

Recently, silicon has been identified as one of the most attractive high-energy anode materials for LIBs. Silicon's low working voltage and high theoretical specific capacity of 3579 mAh $g^{-1}$, nearly ten times higher than that of state-of-the-art graphite anodes, have encouraged widespread research efforts aimed at developing a viable Si based electrode. Despite the advantages of the Si electrode, a number of challenges, mainly associated with the material's severe volume expansion, impede its commercialization. While the commercialized graphite electrode expands roughly 10 to 13% during lithium intercalation, Si's expansion amounts to nearly 300%, generating structural degradation and instability of the all-important solid-electrolyte interphase (SEI). Such instabilities ultimately shorten the battery life to inadequate levels. Degradation of the active material can be mitigated by incorporating materials smaller than 150 nm or through the nanostructural design of electrode architectures capable of reducing expansion. Unfortunately, the electrode architectures presented in previous works lack sufficiently high coulombic efficiencies largely because the volume change during Si alloying and de-alloying renders the SEI at the Si-electrolyte interface mechanically unstable.

Many efforts aimed towards the utilization of silicon in lithium-ion battery anodes work to combine silicon with conventional active materials. This provides higher capacity while minimizing the drawbacks of the silicon material (e.g., volume expansion, active material utilization, etc.). The mixture of nano-silicon (nano-Si) particles in state-of-the-art graphite electrodes has been implemented to commercial practice to increase the capacity of today's anodes. However, this process is limited to the inclusion of only about 5% (by mass) of nano-silicon active material. Any amount surpassing the 5% limit will destroy the electrode's conventional network due to Si's massive volumetric expansion and contraction during lithiation and delithiation.

Preliminary work performed by Applicants demonstrated the impressive long-term cycling stability of a nano-Si electrode/room temperature ionic liquid (RTIL or IL) system and its combination with the commercially available "L333" cathode for a Li-ion cell capable of delivering 1.35× the specific energy of today's state-of-the-art technology, normalized to electroactive material mass. The nano silicon-cyclized polyacrylonitrile (nSi-cPAN) electrode, when combined with an imide-based RTIL electrolyte, maintains an average half-cell coulombic efficiency of greater than 99.97% due to the cooperative effects of a robust electrode architecture and the formation of a stable solid-electrolyte interphase (SEI) layer. International Published Patent Application No. WO 2016/123396, incorporated herein by reference in its entirety, describes the composition of matter formed during the combination and utilization of the nSi-cPAN electrode and composition-specific RTIL electrolytes in Li-ion batteries. Specifically, the application discloses the composition of the SEI formed between the nSi-cPAN electrode and RTIL electrolyte.

Following the demonstration of the nSi-cPAN system, Applicants developed a "micron-Si" (pSi) anode. The utilization of pSi is made possible by leveraging the mechanical strength of the cPAN coating. By encapsulating the pSi particles in a resilient, conductive coating matrix, pulverization of the large Si particles is contained. This mechanism has been dubbed "self-contained fragmentization." The fragmented silicon particles remain adhered to the cPAN coating matrix, enabling the long-term, full utilization of the material with minimal capacity degradation. This mechanism is validated by the ability of the electrode to retain its capacity over many cycles, proving that the silicon particles maintain access to the electronically conductive cPAN matrix even after pulverization. This is demonstrated in FIG. 1 and described in International Published Patent Application No. WO 2016/123396, which describes the composition of matter formed by electrochemically pulverizing large silicon particles within a cPAN matrix.

While the development of the nSi-RTIL system and pSi-cPAN electrode resulted in world-record performance of Li-ion full-cells containing silicon anodes (high mass loadings of silicon, non-preconditioned/pre-lithiated silicon anodes, long cycle life, high energy), this performance was only demonstrated at the laboratory scale. The anodes used to demonstrate these inventions, while containing greater than 70% silicon relative to total anode mass, were thin and not suitable for commercial application; they were "bench-top" demonstrations made for proof-of-concept and proof-of-viability. The slurries used to fabricate these anodes contained 12.5 to 25 wt. % solids content (extremely low solids content and not suitable for commercial manufacturing). Laboratory-standard current collector substrates (greater than 25 to 30 microns thick), low electrode coating thicknesses (resulting in ~2 mAh cm$^{-2}$), small electrode areas, and low currents (suitable for coin-type cell demonstration, in the micro-ampere range) allowed for such demonstrations. Translating these technologies from the benchtop to commercial manufacturing lines presents an entirely new set of challenges.

A commercial anode must provide an areal capacity of at least 2 mAh cm$^{-2}$ such that it can be paired with a cathode for improved energy density and cost in large-format Li-ion batteries. This means that the previously developed anodes must be scaled (2× in most metrics including mass loading and thickness to attain attractive energy densities) and processed under commercially viable means. Commercial anodes must also be developed such that their areal capacity (mAh cm$^{-2}$) remains consistent throughout the entire anode sheet in order to properly match with the cathode capacity when stacked or wound in pouch or cylindrical cells, respectively. Adhesion between coating and current collector substrate, physical properties of the coating, and even the anode electrochemistry change when the anode is scaled to commercial levels. It is well known that it is very difficult to achieve viable, high performing silicon anodes at aerial capacity loadings greater than 2 to 3 mAh cm$^{-2}$ and this is especially true for anodes containing high mass percentages of silicon material (greater than 10 wt. %). This is due to adhesion (between electrode and copper current collector substrate) and cohesion (maintenance of the electrode structural integrity within the electrode itself) issues arising due to the expansion and contraction of the silicon active material during lithiation and delithiation, respectively.

SUMMARY

Described herein are various embodiments of a process and composition of matter used to facilitate consistent and high-quality commercial scale Si-cPAN anodes for Li-ion batteries. In some embodiments, the anodes comprise a film cast over a current collector substrate, with the film comprising active material particles (e.g., silicon particles) and a conductive polymer membrane coating over the active material particles. In some embodiments, the conductive polymer membrane coating comprises a thermoplastic treated to become a cyclized, non-plastic ladder compound. Such anodes can be incorporated into an energy storage device along with a cathode and electrolyte.

Methods of manufacturing the anodes disclosed herein are also described. In some embodiments, the method includes a step of preparing a slurry including active material, additive powder, polymer powder and solvent. The slurry is then mixed for a period of time, followed by casting the slurry over a current collector substrate. A drying and heating step are then carried out.

DETAILED DESCRIPTION

Figure 1:
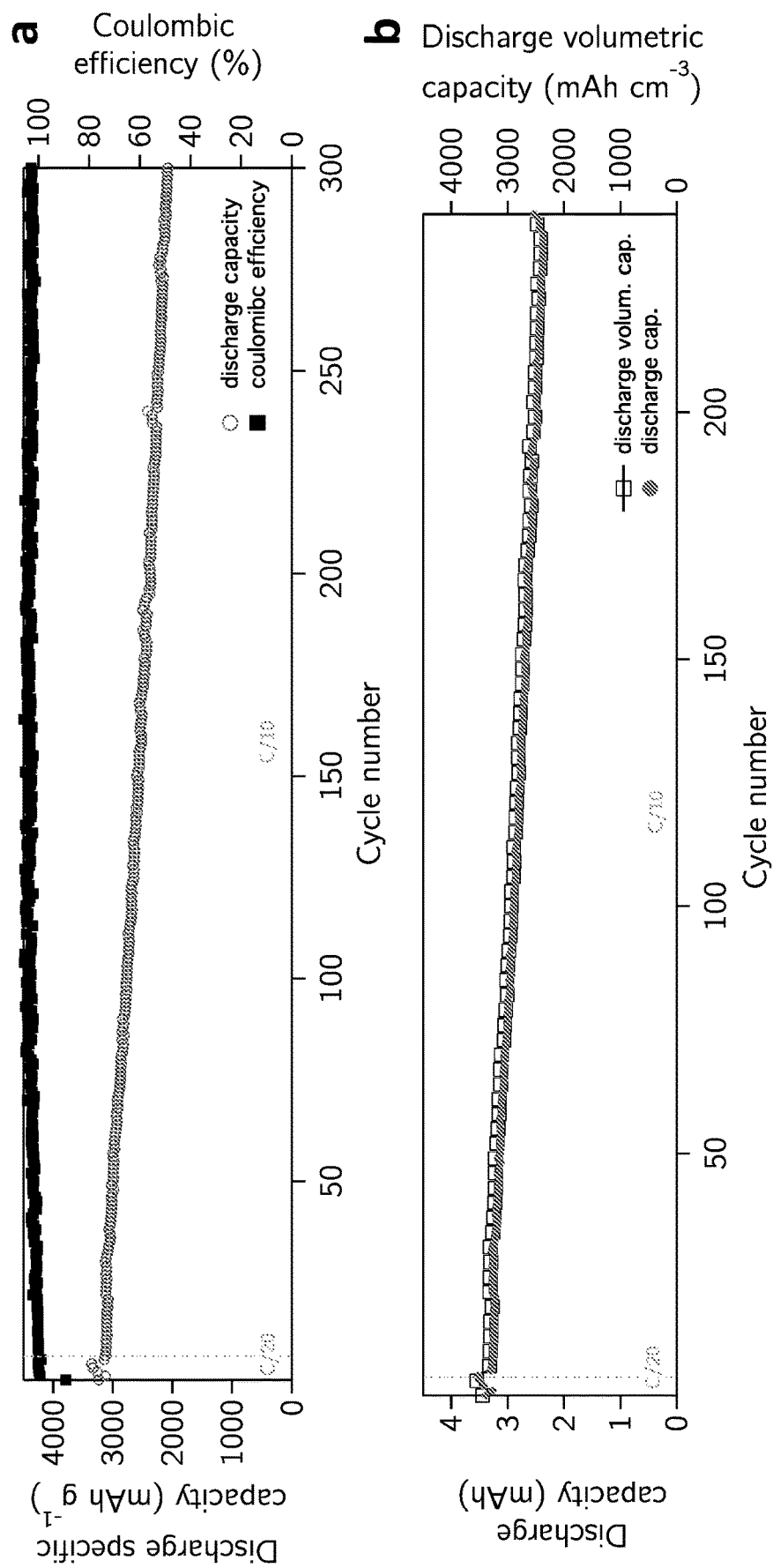
FIG. 1 is a pair of graphs illustrating cycling data of a pSi-cPAN half-cell containing a fluorinated electrolyte additive showing the rapid CE stabilization achieved through use of Applicant's previously disclosed pSi-cPAN/mRTIL system.

The following description details various embodiments of methods associated with creating commercial scale Si-cPAN electrodes, electrochemical implications associated with some or all of these methods, and various embodiments of the resulting compositions of matter. The description is divided into sections according to the steps used to fabricate the electrodes, with each step describing physical parameters which may be used to obtain improved battery performance.

Conventionally, Si-based electrodes are fabricated with polymer binders (such as polyvinylidene fluoride, polyacrylic acid, styrene-butadiene rubber, or carboxymethyl cellulose), conductive additive (usually carbon black), and Si particles mixed in an organic solvent, such as N-methylpyrrolidone (NMP), to produce a viscous slurry. The slurry is then bladed onto a copper foil current collector and dried to form an anode electrode. The embodiments described herein relate to fabrication of a polymer driven composite Si anode that differs from the conventional methods in significant ways.

Surprisingly, the methods described herein are compatible with conventional manufacturing infrastructure, allowing for the first true "drop-in" high-loading silicon anode available to the Li-ion market. Other silicon anode production methods are cost and resource intensive, providing significant value to the methods discussed below. As described in greater detail below, silicon active material is coated in a conductive polymer, such as polyacrylonitrile (PAN), cast on copper foil, and then treated under heat, and paired with a cathode in a specific manner so as to enable full-cell performance.

Polyacrylonitrile is discussed herein as an exemplary conductive polymer for application under the disclosed methods, though other polymers may be used. Other suitable polymers include, but are not limited to, poly(acrylic acid) (PAA), carboxymethyl cellulose (CMC), and alginate. PAN is a resinous fibrous organic polymer made from mixtures of monomers with acrylonitrile as the main component. PAN fibers are the chemical precursors of high-quality carbon fiber when modified accordingly, and they are commercially found in a number of high technology and common daily applications.

A number of active material types can also be utilized under the methods described herein. Silicon will be discussed as an exemplary anode active material for application under this method, with any silicon morphology capable of integration into the anode slurry and electrode sheet. Silicon morphologies include, but are not limited to, nano-spheres, nano-wires, nano-rods, whiskers, "coral-shaped" silicons, micro-spherical silicon, and various nano-featured large particle silicon materials. Silicon-graphite, silicon-graphene, silicon-hard carbon, and other silicon-carbon composite materials are also non-exhaustive exemplary anode active materials for application under the methods described herein. Mixtures of silicon and carbonaceous materials such as graphite or hard carbon are also non-exhaustive exemplary anode active materials.

Lame Batch Slurry Mixing

In order to fabricate the Si-cPAN electrode at scale, the methods described herein can generally begin by preparing a slurry. The slurry is generally prepared by mixing active materials, polymer, auxiliary materials, and additives in a solvent. The resulting slurry preferably has specific rheological properties in order to provide highest electrochemical cycling performance in a Li-ion battery. In some embodiments, the composition of the material added to the solvent includes from about 10 to about 50 wt. % PAN and from about 50 to about 90 wt. % active material. In some embodiments, the slurry comprises from about 30 to about 60 wt. % solids in from about 70 to about 40 wt. % solvent.

Active material used in preparation of the slurry can include combinations of materials in different compositions. For example, carbonaceous active materials (graphite, graphene, hardcarbon, etc.) may be mixed in to form a 10:90 silicon:carbonaceous material weight ratio or 90:10 silicon:carbonaceous material weight ratio. Exemplary commercial Si:cPAN anodes can include a 30:55:15 Si:Carbonaceous material:PAN weight ratio. Other exemplary weight ratios include 40 to 80 wt. % silicon with 5 to 50 wt. % carbonaceous material and 10 to 20 wt. % PAN. The carbonaceous material may include mixtures of active material and conductive additives including but not limited to carbon black or carbon nanotubes.

The mixture of active material and conductive binder powder is dispersed in solvent to form a slurry. In some embodiments, the solvent is chosen such that it is capable of dissolving the conductive binder. For example, N,N-dimethylformamide (DMF, 99%) is an exemplary solvent for application under the methods described herein when utilizing the PAN polymer. Other suitable solvents include, but are not limited to, dimethyl sulfone ($DMSO_2$), dimethyl sulfoxide (DMSO), N-methyl-2-pyrrolidone (NMP), N,N-dimethyl acetamide (DMAc), ethylene carbonate (EC), and propylene carbonate (PC).

Slurry viscosity determines the mixing quality, coating quality, and ability to generate large films upon the current collector substrate. Using Brookfield viscosity (spindle 64), exemplary slurry viscosities can be determined (all measurements taken at room temperature, 23° C.). Slurry viscosity is determined by the solvent/polymer mass ratio and polymer chain length, as well as by the mass of solvent relative to total slurry mass. An exemplary slurry made using the materials and the methods described herein exhibits significantly more Newtonian character than conventional Li-ion anode slurries. A Newtonian fluid is a fluid in which viscous stresses arising from the fluid's flow are linearly proportional to the strain rate or the range of change in the fluid's deformation. This means that as shear force is applied to the slurry described herein, the slurry does not exhibit as much shear thinning relative to conventional Li-ion anode slurries. This has implications in the anode mixing and coating process, as the slurry can be mixed at much higher RPMs and can be successfully coated at very low thicknesses. The low shear thinning nature of the slurry can be studied using a Brookfield viscometer, which is a common instrument in rheological characterization. In some embodiments, the slurry has a Brookfield of viscosity ranging between 3000 to 6000 centipoise (cP) between spindle rotations (steel spindle #64) of 12 through 100 RPM at room temperature, varying by less than 1000 cP for a given slurry mixture. The relatively low variation in viscosity across a range of shear force (described by spindle rotation in RPM) suggests the Newtonian nature of the slurries. Other exemplary slurries range in viscosity from 3500 to 5000 cP at 20 to 100 RPM at room temperature.

Slurry mixing parameters are contributors to the performance of the resulting anode. Along with mass percentages, powder mixing, and slurry viscosity, slurry stir time and slurry volume are important factors in determining the polymer coating quality on the active material. Slurry time is important to allow for uniform polymer coating over the suspended active material particles. In some embodiments, slurry mixing times of up to 12 hours are sufficient. In some embodiments, lower stir times, such as 2 hour stirs, are sufficient with proper equipment.

Slurry mixing can be completed on a variety of equipment. Vacuum and non-vacuum planetary centrifugal mixers (e.g., "Thinky Mixer" or "ross" mixer), slurry planetary dispersing vacuum mixing machines, double planetary disperser mixers, homogenizers, and simple stirring in a beaker with a stir bar on a stir plate can create adequate mixing conditions.

Slurry volume is important because an adequate amount of material must be present to create adequate mixing. Slurry volume also influences the electrochemical performance of the resulting anodes. If the slurry volume is too low, a relatively large portion of the material will not undergo stirring/mixing and a uniform coating will not be applied. For example, mixtures comprised of 200 mg active material plus polymer powders and 1.6 g solvent (87.5% total slurry mass solvent) will not mix properly. There is not enough slurry to create sufficient mixing in this case, regardless of mixing method. Slurries utilizing 1.2 g active material plus polymer powders in 8.4 g solvent (87.5% total slurry mass solvent) mix well, as do slurries utilizing 1.2 g active material plus polymer powders in 4-6 g solvent, resulting in uniform polymer coating over the active material. However, this solids content (12.5 wt. % solids) is not suitable for coating on large scale manufacturing equipment. These slurries will have too low of viscosities and will not be capable of coating via roll-to-roll methods (e.g., comma bar, slot die, etc.).

Figure 2:
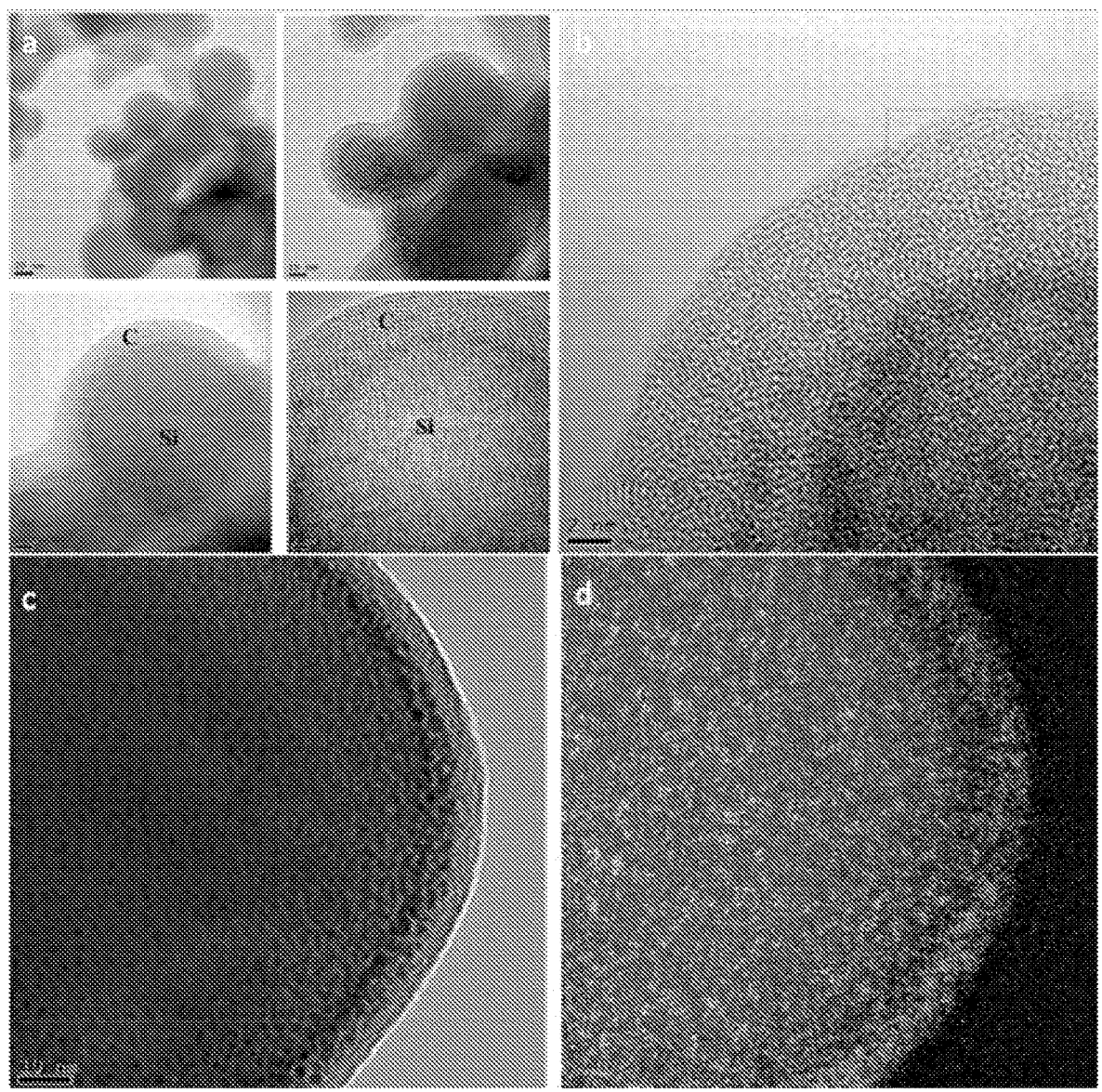
FIG. 2 provides high-resolution transmission electron microscopy images (HR-TEM) of nano-spherical silicon particles coated in polyacrylonitrile.

PAN coating quality over the silicon material, resulting from the aforementioned parameters, becomes increasingly important as the anode mass loading increases. Whether adequate coating has been achieved can be confirmed using microscopy, such as transmission electron microscopy, to identify coating homogeneity and thickness. PAN coatings resulting in strong morphology retention throughout electrochemical cycling should be at least 3 to 5 nanometers thick, found on all surfaces of the active material particles, and present throughout the electrode. Examples of exemplary coatings, formed using the methods described above, are shown in FIG. 2. Electron energy loss spectroscopy (EELS) highlights the silicon and PAN coating (d). A uniform, 3 to 5 nm coating is present on particles throughout the electrode matrix.

When preparing the slurry, it may also be suitable to add electrode additives that are capable of enhancing performance in full-cell Li-ion batteries. Exemplary electrode additives include, but are not limited to, lithium metal powders (such as stabilized lithium metal powder, SLMP) and lithium nitride ($Li_3N$), as well as other high lithium content powders and salts. These dry powders can be added directly to the slurry and mixed along with the other slurry components. Oxalic acid can also be added to the slurry to improve dispersion and adhesion properties.

Generally speaking, the polymer dissolves in the solvent. The slurry is then mixed in order for the polymer material to adequately coat the active material powder, which is dispersed in the polymer/solvent solution.

Electrode Coating

After mixing a slurry, the slurry is cast on a current collector substrate via, e.g., roll-to-roll coating methods. Roll-to-roll coating machines can be used to create hundreds of meters of electrode in single runs. The roll-to-roll coating process is determined by the physical properties of the slurry (e.g., shear, viscosity, etc.). The current collector foil is drawn through the coater at a speed of 0.2 to 50 meters/minute, and the coated foil passes through a drier set to a temperature of from 30 to 70° C. for water based slurries and from 110 to 160° C. for solvent-based slurries. In the case of the technology described by this application, the drier temperature should be set to 30 to 70° C. despite being a solvent-based system.

Figure 3:
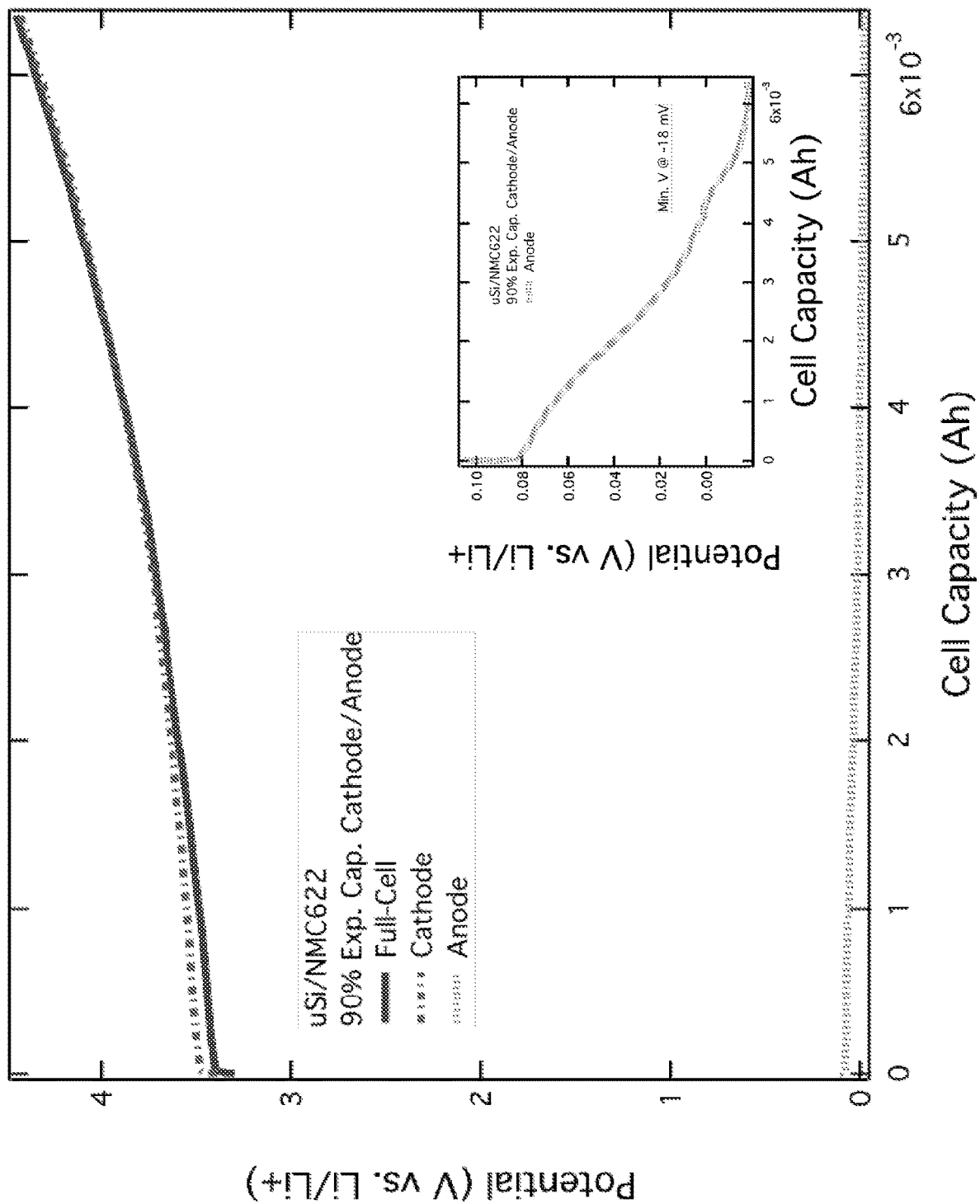
FIG. 3 is a graph illustrating a full-cell pouch three electrode experiment with micron-silicon (anode) and NMC [622] (cathode) working electrodes and a lithium counter electrode, with a N/P ratio of 0.9.
Figure 4:
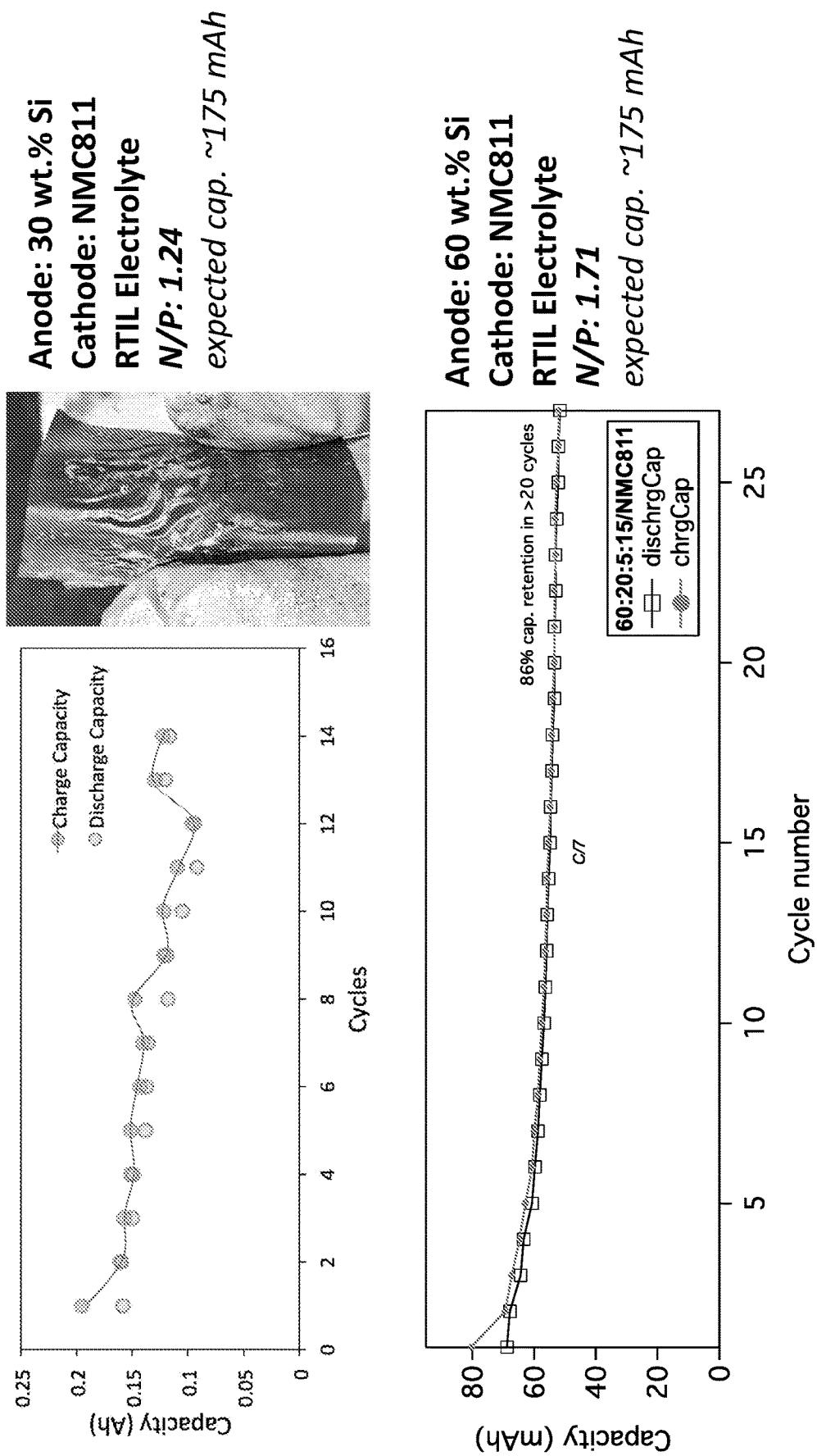
FIG. 4 is pair of graphs illustrating pouch full-cell cycling data comparing impacts of a low N/P ratio to a sufficient N/P ratio.

An important factor to electrode coating is the resulting areal mass loading of silicon per square centimeter, the capacity this provides, and how these numbers match to the cathode utilized in the full cell. In order to pair with high energy cathode materials, including the "nickel-rich NMC" (nickel manganese cobalt oxide cathodes), the areal capacity of the anode should be from 1.3 to 2.0× the areal capacity of the cathode. This factor is known in the industry as the "N/P ratio" (negative electrode capacity/positive electrode capacity). In conventional Li-ion cells containing graphite anodes, the N/P ratio is typically from 1.1 to 1.2, and is set to avoid lithium plating on the anode during cycling. The N/P ratio devised for the system described herein is designed to cover efficiency losses during initial cycling and to "pin" the anode half-cell voltage between 0.01 and 1.5 V vs. $Li/Li^+$. If the N/P ratio is too low, the anode half-cell voltage falls below 0.01 V (due to full- and over-lithiation of silicon) and the anode will be destroyed. This is illustrated in FIG. 3. FIG. 4 shows a cell with a poor N/P ratio compared to a cell with a strong N/P ratio. The higher relative N/P ratio also prevents wrinkling and deformation of the anode films due to the expansion and contraction of the silicon material present in the films. A desirable N/P ratio depends on the silicon mass loading relative to the total anode film mass. If the anode film comprises 20 to 50 wt. % silicon, the N/P ratio should be 1.2 to 1.6. If the anode film comprises greater than 50 wt. % silicon, the N/P ratio should be greater than 1.6. In some embodiments, the weight percent of silicon in the anode can be added to "1" to obtain the minimum N/P ratio for the system. In other words, if the anode comprises 40 wt. % silicon, the N/P ratio for the resulting full-cell system should be greater than 1.4.

Current Collector Substrate

The current collector substrate, typically a metal foil, is used to move electrons from outside the cell to the electrodes, and vice versa. The electrode slurry is cast onto the foil in a coating of uniform thickness. In order for the Li-ion battery to function properly, the electrode coating should be adhered adequately to the current collector foil and should maintain this adherence throughout cycling. In alloying electrodes, such as silicon, this is especially difficult when using large format electrodes (which tend to be very thick) given the expansion properties of the active material. The conductive binder is responsible for adhering the anode film to the current collector substrate; in large format electrodes it is necessary to have sufficient binder present to allow for adherence. In the silicon plus PAN system described herein, 10 to 25% PAN, relative to total anode coating mass, is the minimum polymer content allowable. This is unique to scaled, large format silicon anodes with thickness greater than 5 micrometers.

Significantly and surprisingly, the physical properties of the current collector substrate are of high importance to the performance of the resulting anode sheets. Along with anode composition, the physical properties of the current collector substrate allow for cell longevity. Copper foil is an exemplary current collector substrate and is most commonly used in conventional Li-ion cells. Copper foil properties are discussed herein.

An important physical property in the copper relative to anode film adhesion is surface roughness. One measure of roughness is ten-point height or maximum height ($R_z$). This is a root mean square value. $R_z$ is defined as the average of the peak-to-valley numbers in a given scan area, with at least five consecutive points measured (five highest peaks+five highest values=10 points). For some embodiments of the anodes described herein to maintain adherence throughout cycling, the copper $R_z$ should be at least 1.5 micrometers. Other embodiments with larger active materials may require higher surface roughness up to 6 to 7 micrometers. Other embodiments with nanoscale active materials require $R_z$ values greater than 0.5 micrometers. Copper foils used in conventional/previously commercialized Li-ion anodes commonly have $R_z$ values below at or below 0.5 microns.

Another measure of surface roughness is the arithmetical mean height (Sa) which expresses the magnitude of the difference in height of each point compared to the arithmetical mean of the surface. Yet another measure of surface roughness is the developed interfacial area ratio (Sdr) which is the percentage of the area's surface contributed by the texture as compared to the planar definition area (i.e., a completely level surface has Sdr=0). Each of these parameters, along with their relative magnitudes, are important to performance of the system described herein.

As mentioned previously, required copper surface roughness for viable performance is highly dependent upon active material size. Current data suggests that if electrode film expansion is below 50% in the z-axis (normal to the electrode substrate) and the active material particle size is above 500 nanometers, copper with surface roughness $R_z$ greater than 0.5 micrometers provides the best performance. If electrode film expansion is above 50% in the z-axis (normal to the electrode substrate) and the active material particle size is above 500 nanometers, copper with surface roughness $R_z$ greater than 2 micrometers provides the best performance.

Figure 5:
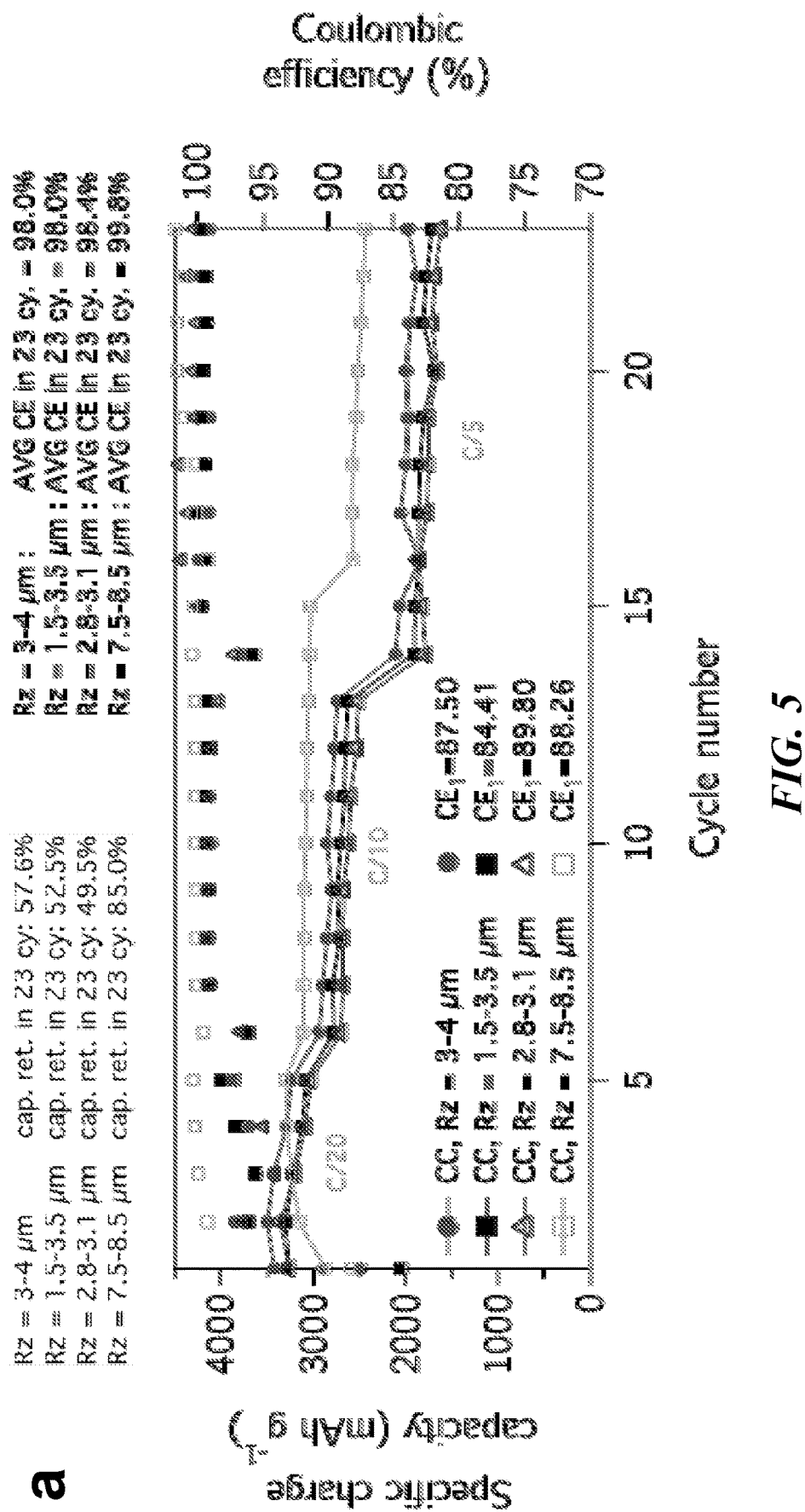
FIG. 5 provides a graph showing Half-cell cycling performance of Silicon/PAN anodes highlighting 1 to 3 micrometer silicon particles' (D50 size) performance on a range of coppers with different surface roughness, and images of surface morphologies (b)-(e) of various copper materials with varying surface roughnesses.
Figure 5:
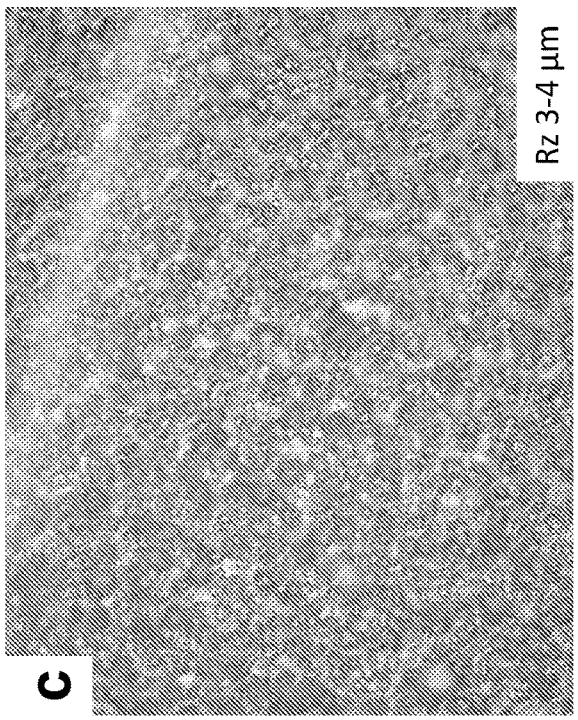
Figure 5:
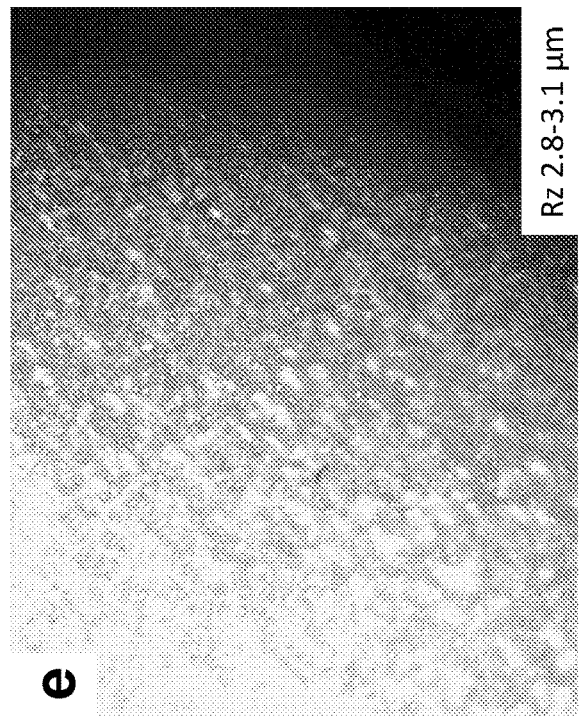
Figure 5:
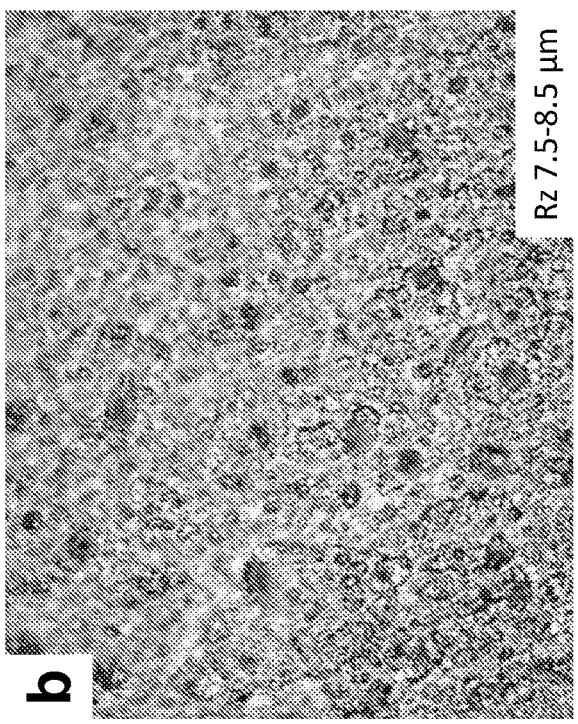
Figure 5:
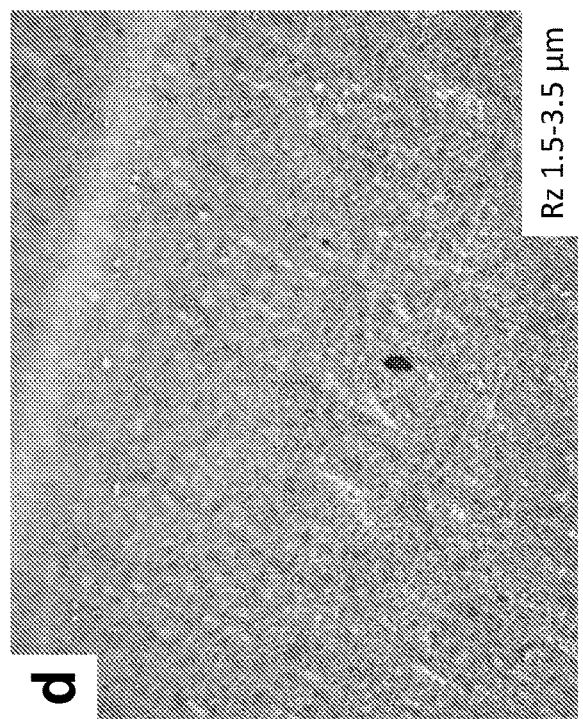

Unfortunately, the higher surface roughness is associated with a necessary higher thickness, which is detrimental to battery energy density as the thicker current collector (an auxiliary material that does not contribute to cell capacity) takes up space and does not provide energy. Improved adherence on rougher copper surfaces is explained by increased surface area available for adherence between the conductive polymer and the copper. With reference to FIG. 5, various copper surfaces were imaged under an optical microscope for comparison.

Figure 6:
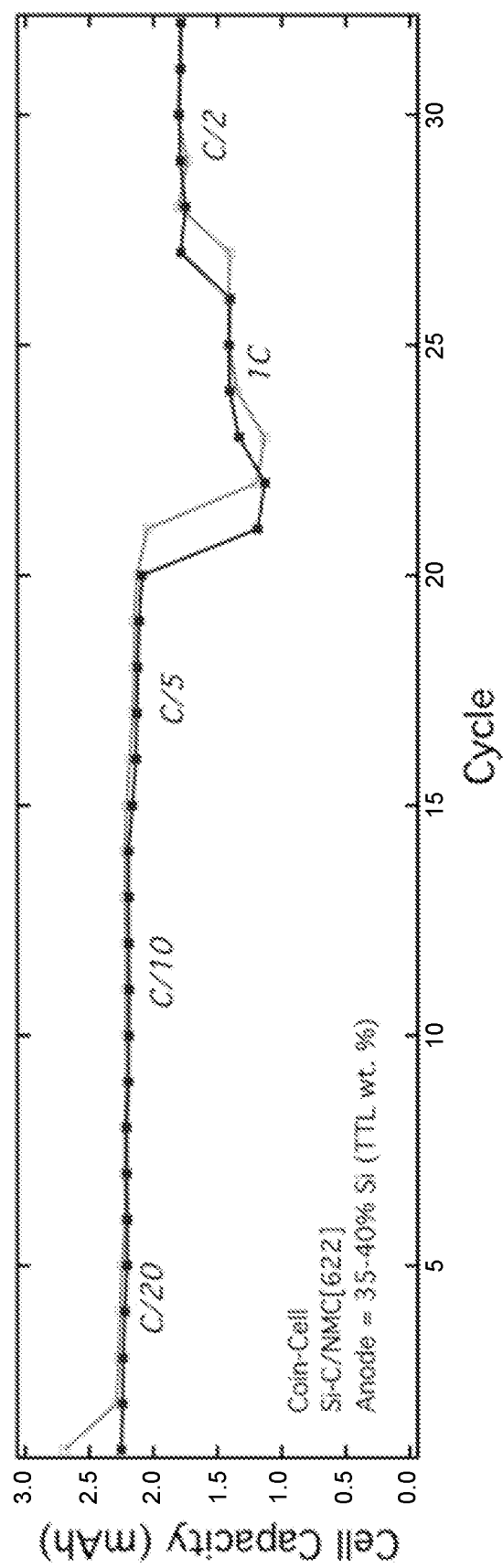
FIG. 6 is a graph showing full-cells (coin) containing silicon/carbon active material with PAN conductive binder (30 to 35% silicon normalized to total anode coating mass) and NMC[622] cathodes comparing anode current collector roughness.

Performances of half-cells containing a silicon plus PAN anode are also shown in FIG. 5, demonstrating the clear need for appropriate copper surface roughness to maintain adherence to the anode film during many charge-discharge cycles, based on the active material morphology and anode film structure. In half-cells, the first cycle coulombic efficiency (CE) is higher and CEs stabilize much more quickly in cells containing rougher copper foils; this is attributed to maintained electronic contact in the cell and faster electron transport. The CE behavior and associated electron transport/adhesion properties manifest in higher performing full-cells with active material particles of size greater than 500 nanometers, as shown in FIG. 6. In full-cells containing anode current collector films with $R_z$ at or under 1 microns, cell performance gradually declines and eventually crashes within 50 cycles.

Figure 7:
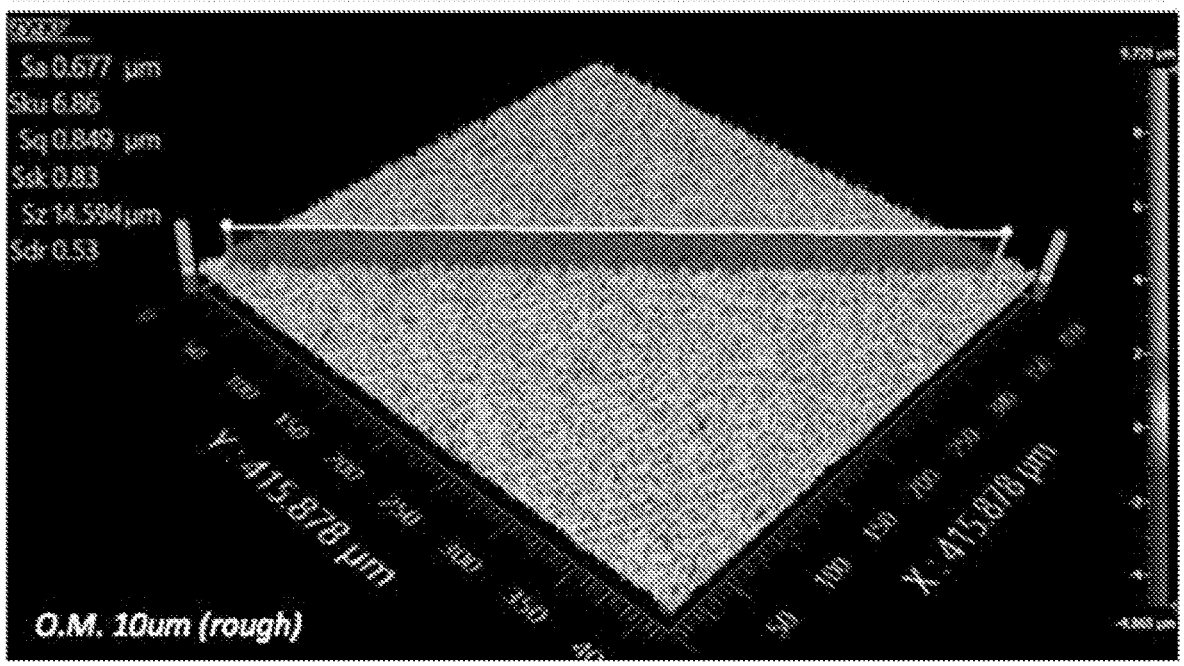
FIG. 7 provides a summary of various copper types, their relevant roughness parameters, and a representative surface profilometer spectrum for the first copper type ("O.M. 10 um (rough)" copper).

A summary of various copper types, their relevant roughness parameters, and a representative surface profilometer spectrum for the first copper type ("O.M. 10 um (rough)" copper) are provided in FIG. 7. The copper types notated with shaded font ("O.M. 10 um (rough)" and "VL10|23 um" coppers) provide the best performance across a range of silicon material types and anode film microstructures. The materials shown in FIG. 7 generally perform the best with the scaled electrode system described herein. As such, a new parameter, Sa/Sdr, is used to describe the best performing copper foils based on roughness parameters. Sa/Sdr describes the ratio in magnitude of the mean height of peaks and valleys in the foil surface to the percentage of surface caused by roughness. In other words, a high Sa/Sdr means that the copper surface has very high peaks relative to the total roughness and have a low frequency, where the Sa/Sdr near 1 suggests that the copper surface peak/valley heights are more equally distributed. The Sa/Sdr nearer to 1 is found to be favorable, with Sa/Sdr under 3 found to be sufficient for high performance with a range of silicon material types and anode film compositions and microstructures.

Electrode Calendaring

In some embodiments, the electrode is dried after coating on the roll-to-roll coating equipment with the drier temperature should be set to 30 to 70° C. with air flow. After slurry casting on current collector foil and solvent drying/evaporation, conventional graphite anodes are calendared to about 70% of their original film thickness. This calendaring results in porosities of about 40 to 50%. Such a process provides higher degrees of particle contact while still allowing for adequate electrolyte penetration. Beyond 50% porosity, conventional anodes lack sufficient mechanical strength to withstand battery production and operation. The system described herein is different. The electrode requires higher porosity in order to accommodate the volume expansion of the silicon material, and higher inter-film surface area is advantageous for formation of a robust SEI layer and faster $Li^+$ ion transport. The anodes described herein, including the silicon plus PAN anode, are calendared to a porosity of 40 to 70%. Exemplary porosities of the Si-cPAN composite will be 50 to 60%. This compares to traditional graphite anodes, which are about 30 to 40% porous. Traditional electrodes containing silicon, which today range in up to 15 wt. % Si, (PAA, CMC, SBR, etc. binders) have porosities ranging from 40 to 50%. Active materials showing higher degrees of expansion require electrodes with higher porosities.

Electrode Heat Treatment

An important aspect of the anode described herein lies in the ability of a conductive polymer binder to act as both a binder material and an electronically conductive matrix capable of providing efficient charge transfer throughout the composite. Creating a high performing anode film of this type at scale is indeed difficult and requires the understanding of many intricacies, as described above, but another layer of complexity is added by the need to treat many conductive polymers in order to attain electronic conductivity. The exemplary conductive polymer discussed herein (e.g., PAN) can be heated in a reducing atmosphere or under vacuum in order to exhibit electronic conductivity. At the same time, the polymer can be treated such that the polymer matrix does not become too brittle for the mechanical effects of battery cycling (caused by heat treatment at very high temperatures or under inadequate atmosphere). Moreover, the treatment should be conducted such that the auxiliary components of the electrode (i.e., copper) are not affected and remain in condition for battery operation.

Figure 8:
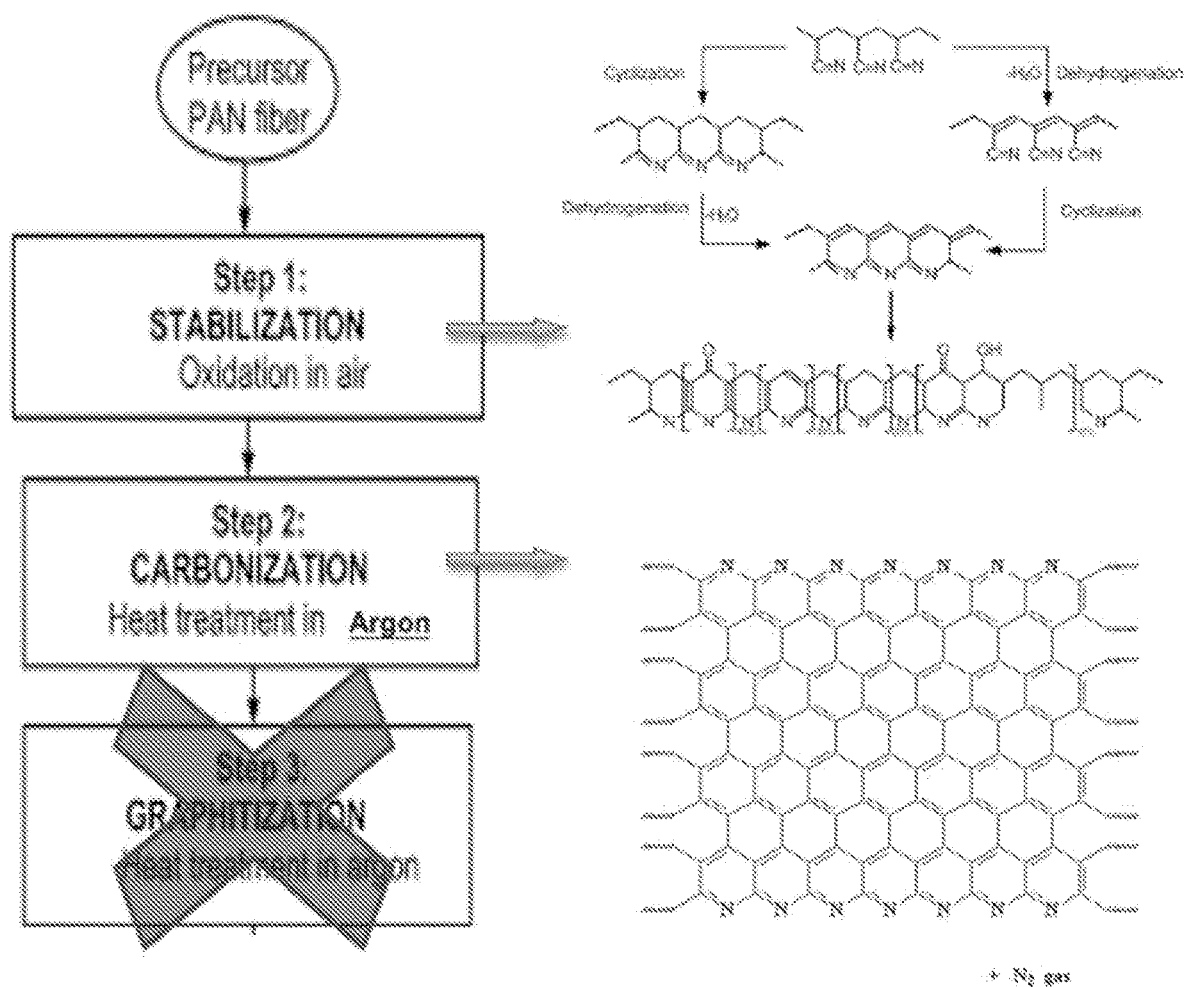
FIG. 8 illustrates a Polyacrylonitrile heating process.

Many conductive polymers are capable of chemical transformation resulting in electronic conductivity, however most need the addition of cross-linkers to catalyze these chemical reactions. PAN and copolymers of PAN are unique in that they are self-catalytic through heat treatment processes. PAN is a unique linear semi-crystalline organic polymer with molecular formula $(C_3H_3N)_n$. PAN's molecular structure is composed of carbon chains with coordinated nitrile groups. The chemistry of PAN is of particular interest because of PAN's unique self-catalytic cyclization reaction and cross-linking through thermal stabilization. PAN's chains degrade before they reach the melt state and the degradation process, commonly referred to as "cyclization," turns linear PAN chains into thermally stable conjugated ladder-like structures that do not flow or dissolve. This is illustrated in FIG. 8. This thermal stabilization allows the fibers to withstand carbonization and graphitization temperatures (about 1000 to 3000° C.) and yield high performance carbon fibers without excessive weight lost or chain scission.

Thermal stabilization of PAN refers to the low temperature (generally 200 to 300° C.) conversion of the polymer fibers to a high temperature resilient fiber. The conversion is necessary for the fibers to survive carbonization (800 to 1300° C.) and graphitization (1300 to 3000° C.) with the highest possible carbon yield and superior properties. The major chemical reactions involved in this process are known as cyclization, dehydrogenation, oxidation, and cross-linking which result in the formation of a thermally stable conjugated ladder structure.

Cyclization is an important reaction during the stabilization of PAN and a main focus for the treatment of the anode described herein. Cyclization takes place when the nitrile bond (C≡N) reacts to develop crosslinking between molecules of PAN, creating a double bond (C=N) and a stable conjugated ladder polymer of fused pyridine rings. The thermal stability of the stabilized fiber is attributed to the formation of the ladder structure by cyclization of the nitrile groups, enabling the operation of stabilized PAN at high temperatures with minimum volatilization of carbonaceous material. Cyclization is the reason why stabilized fibers change color from white to yellow to brown to black. Cyclization is exothermic and has the potential to damage the fibers if done too quickly. The fibers can shrink excessively, lose significant mass, and even melt and fuse together. Conversely, if the stabilization procedure is too conservative (both with time and heat) the fibers will only partially stabilize. Unlike dehydrogenation, cyclization does not need the presence of oxygen to take place, so it can occur in an inert atmosphere. The reaction atmosphere is important in the method described herein since the anode copper foil current collectors are involved in the heat treatments of PAN and any exposure to oxygen at temperatures above 100° C. will oxidize the foils creating deficiency issues (electronic resistances and electrochemical side reactions).

In embodiments described herein, PAN is treated only to its stabilized (specifically 'cyclization') stage and then the resulting pyridine-based conjugated polymer is applied as an electrode binder/coating with robust mechanical properties as well as intrinsic electronic properties. The reason from deviating from the conventional stabilization procedure for high carbon yield and high performance carbon (oxidation, dehydrogenation, and cyclization to perform carbonization and graphitization) is to avoid the formation of a highly oriented (aligning of basal planes), stiff, and brittle coating around an active material prone to high degrees of expansion and contraction.

Figure 9:
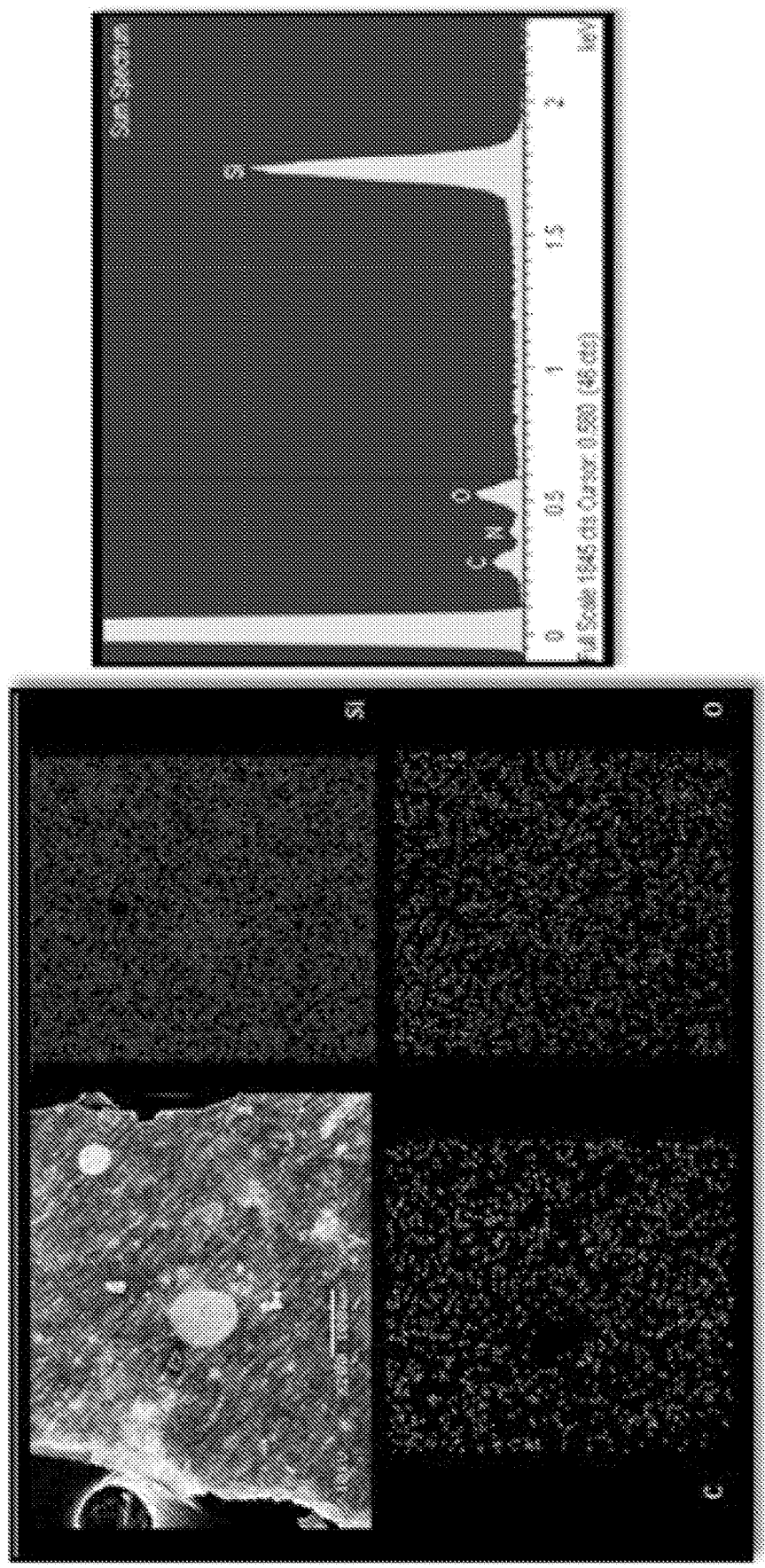
FIG. 9 provides SEM and EDS (with mapping) of polymer driven nano-composites comprising silicon and PAN after heat-treatment under argon.
Figure 10:
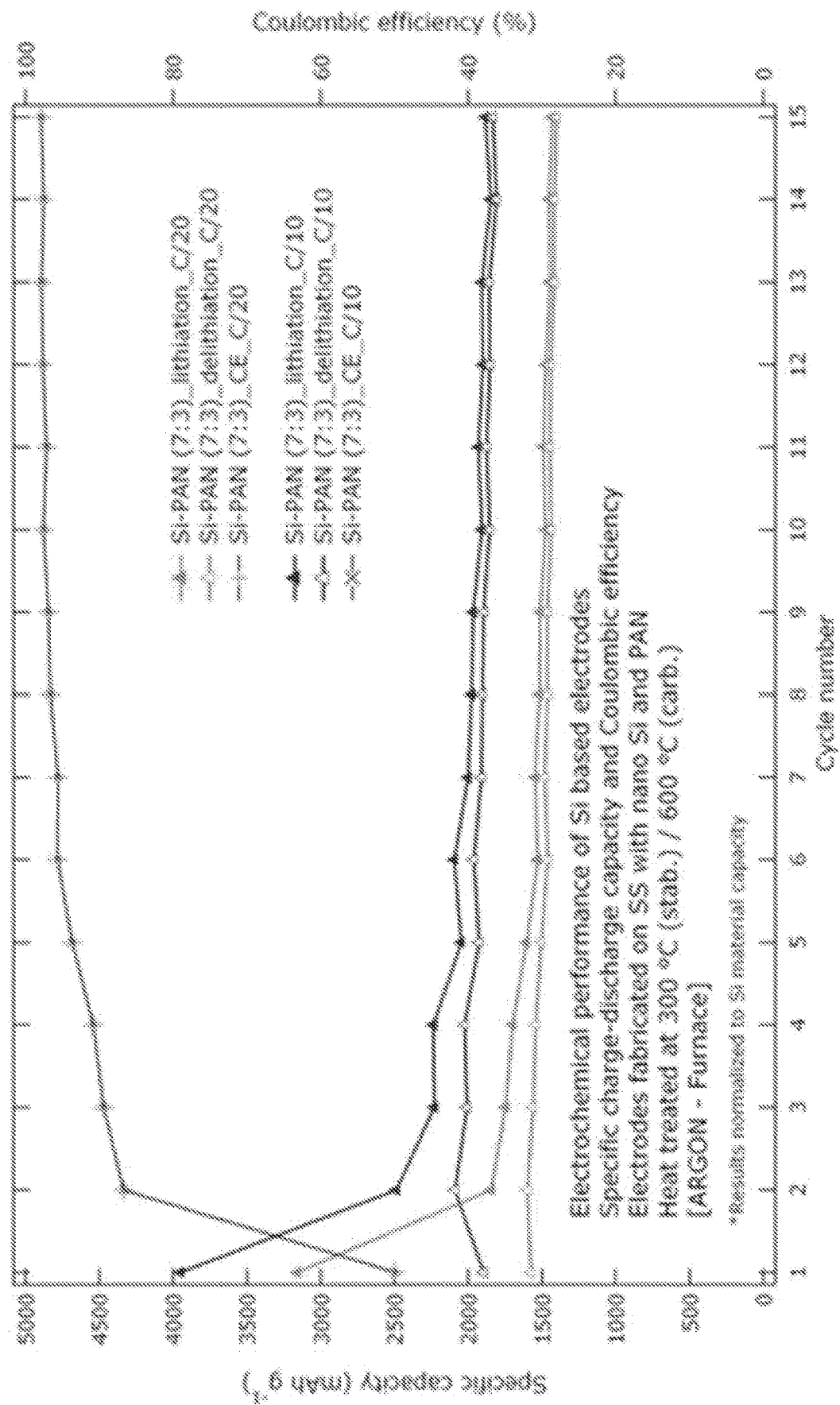
FIG. 10 is a pair of graphs illustrating electrochemical performance of PAN/Si nano-composite anode heat treated at 300° C. under argon (top) and air (bottom) environment followed by a heat treatment at 600° C. under argon.
Figure 10:
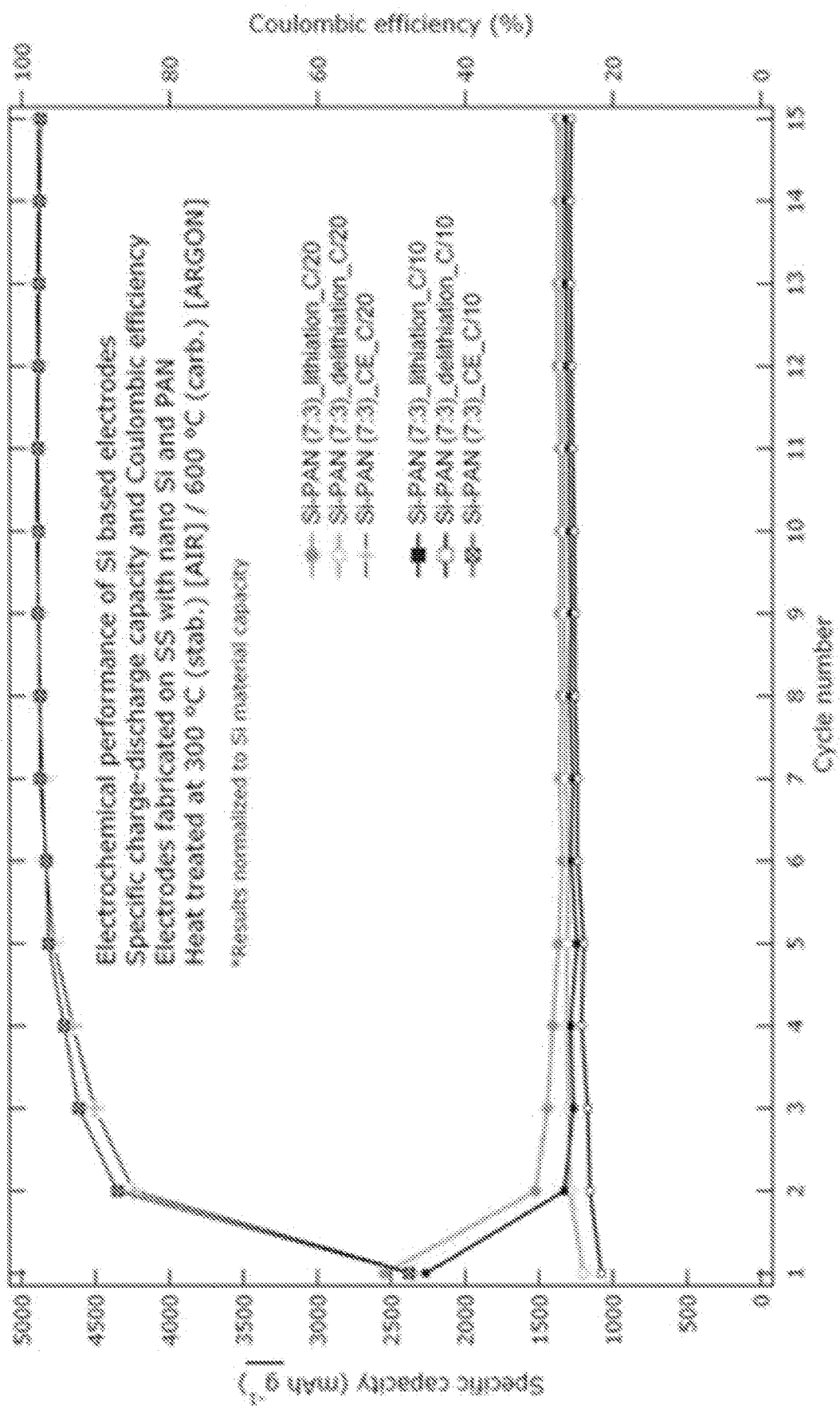
Figure 11:
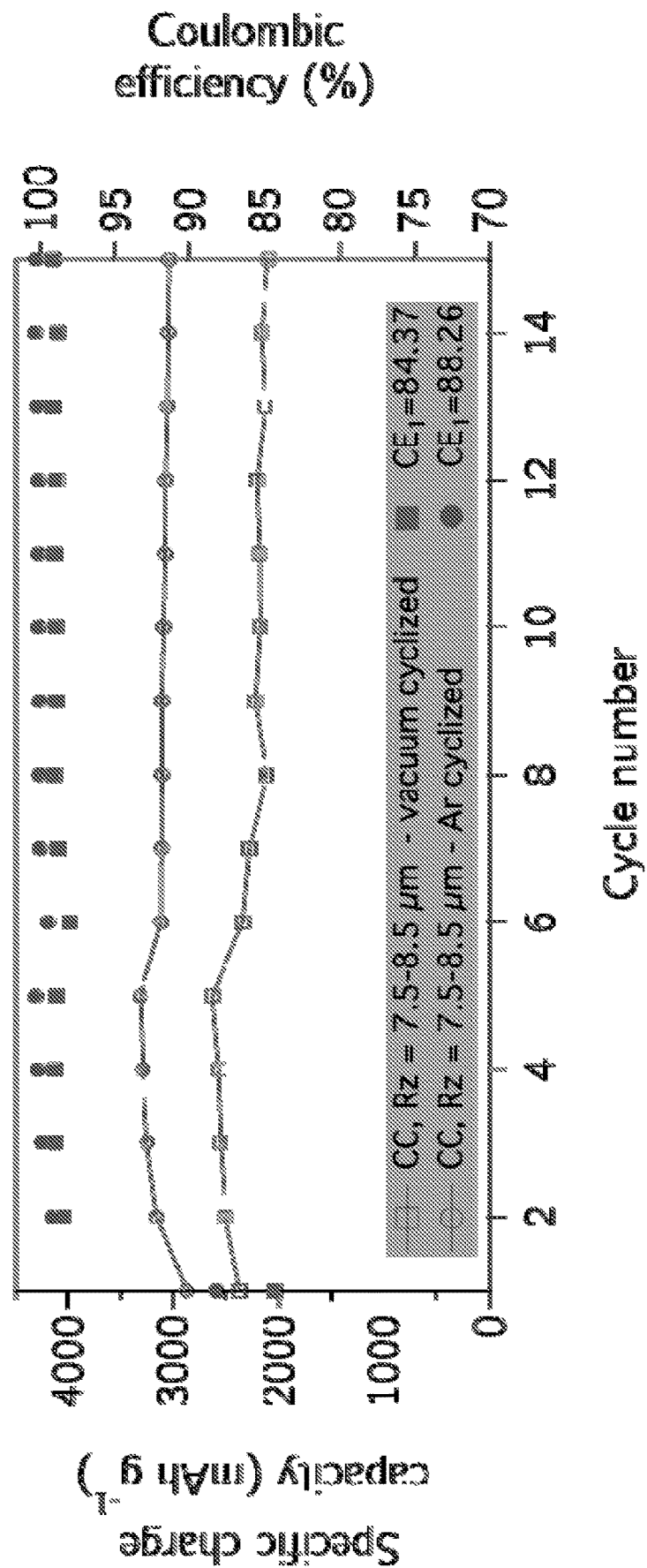
FIG. 11 is a graph comparing cyclization in a vacuum oven and under argon flow in a tube furnace, showing high CE and high capacities when cyclized under either environment.

The stabilization of PAN from linear molecules to ladder polymer compounds by cyclization can be conducted by heating in an inert environment from 100 to 500° C., with an exemplary temperature for PAN's cyclization heat treatment at 300° C., at a rate of 5° C./min with 2 to 12 hr hold time at the peak temperature. Running a range of temperatures allowed for determining the best peak for the electrochemical performance of a PAN/Silicon configuration. FIG. 9 shows scanning electron microscopy (SEM) images and energy dispersive spectroscopy (EDS) analysis on some of these polymer driven nano-composite samples. PAN/silicon samples were tested using the above-described methods and others were subsequently treated for the carbonization of PAN and held for 1 hr at peak temperatures of 500° C., 600° C., 700° C., 800° C., 900° C. and 1000° C. under an the same argon atmosphere. Again, the heating rate of 5° C./min was kept for this second stage of heat as well. FIG. 10 and FIG. 11 illustrate electrochemical data of various heat treatment tests.

In addition to the treatment parameters of heating time and temperature, the equipment utilized and resulting atmospheric conditions are important. The anode should be treated under vacuum or inert gas flow, as previously discussed. Argon and nitrogen are exemplary inert gas atmospheres, with pressures of 20 to 80 PSI providing the most consistent heating conditions. Heat treatment under vacuum also allows for adequate cyclization conditions and high performing anodes. These atmospheres can be provided in a range of equipment types, including tube furnaces, gloveboxes, vacuum ovens, or other atmosphere controlled ovens. Gas flow during heat treatment allows for improved heating and electrochemical performance as the by-products of the polymer chemical reaction (including hydrogen off-gassing during PAN cyclization) are flushed from the system and therefore cannot react with the electrode or current collector substrate. Gas flow through the tube furnace should be set at a rate of 100 to 1,000 liters per hour for best performance. An entire roll of anode, or multiple rolls of anode, can be treated in a single oven. An atmosphere controlled furnace can also be added to the industry standard roll-to-roll coating system utilized for electrode fabrication. Typically the electrode travels through a drying oven immediately after coating; the electrode could also be passed through an atmosphere controlled furnace following initial drying with conditions set to induce polymer chemical transformation (i.e., PAN cyclization) before being rolled onto a spool. In lieu of this equipment, tube furnaces provide a commercially viable means of treating large rolls of anode, including the Silicon/polyacrylonitrile composite.

Figure 12:
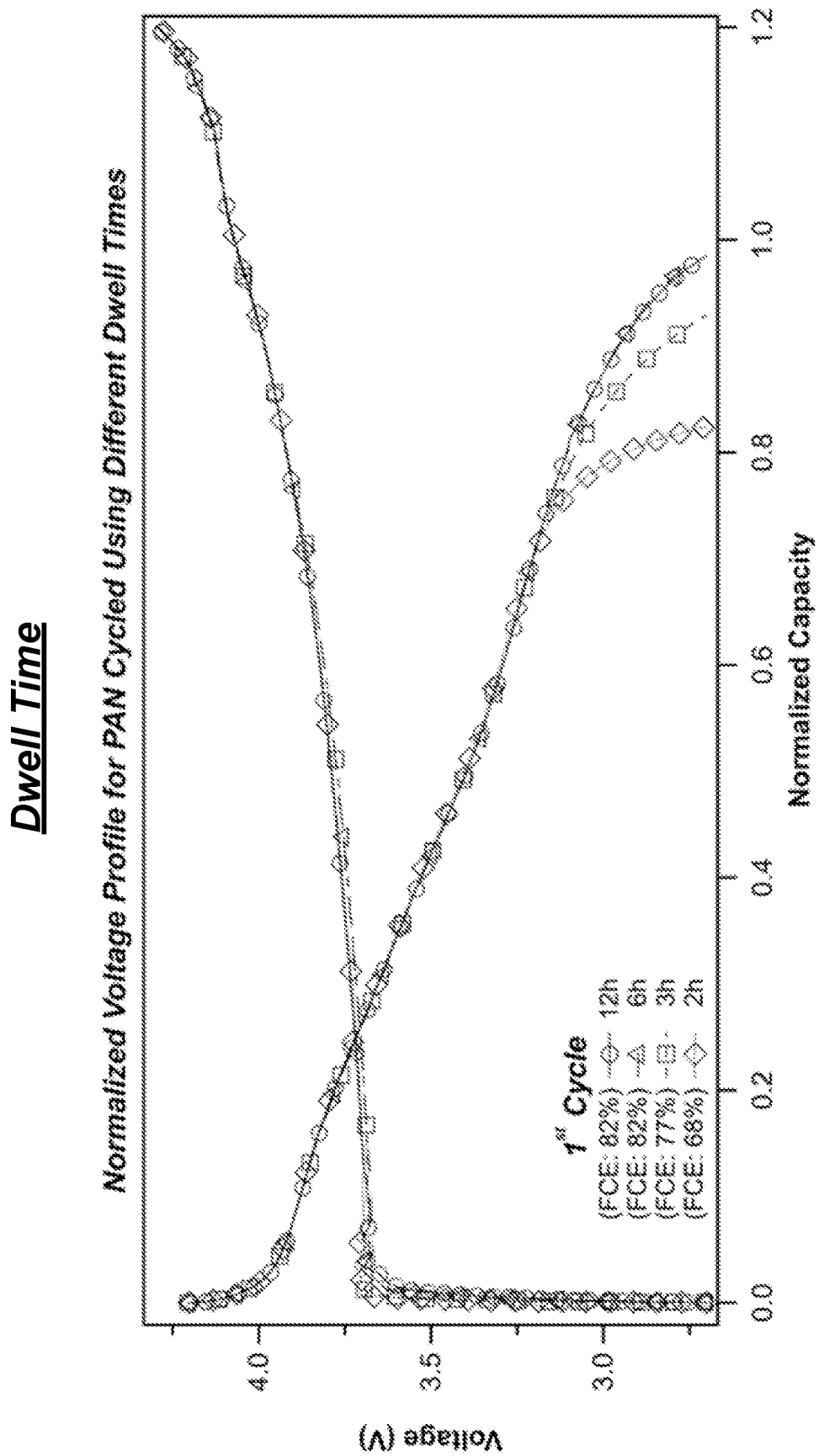
FIG. 12 is a series of graphs showing first cycle voltage profiles of full-cells containing nickel-rich NCM cathodes and Si-cPAN anodes, in which the anode component was heat-treated under various procedures.
Figure 12:
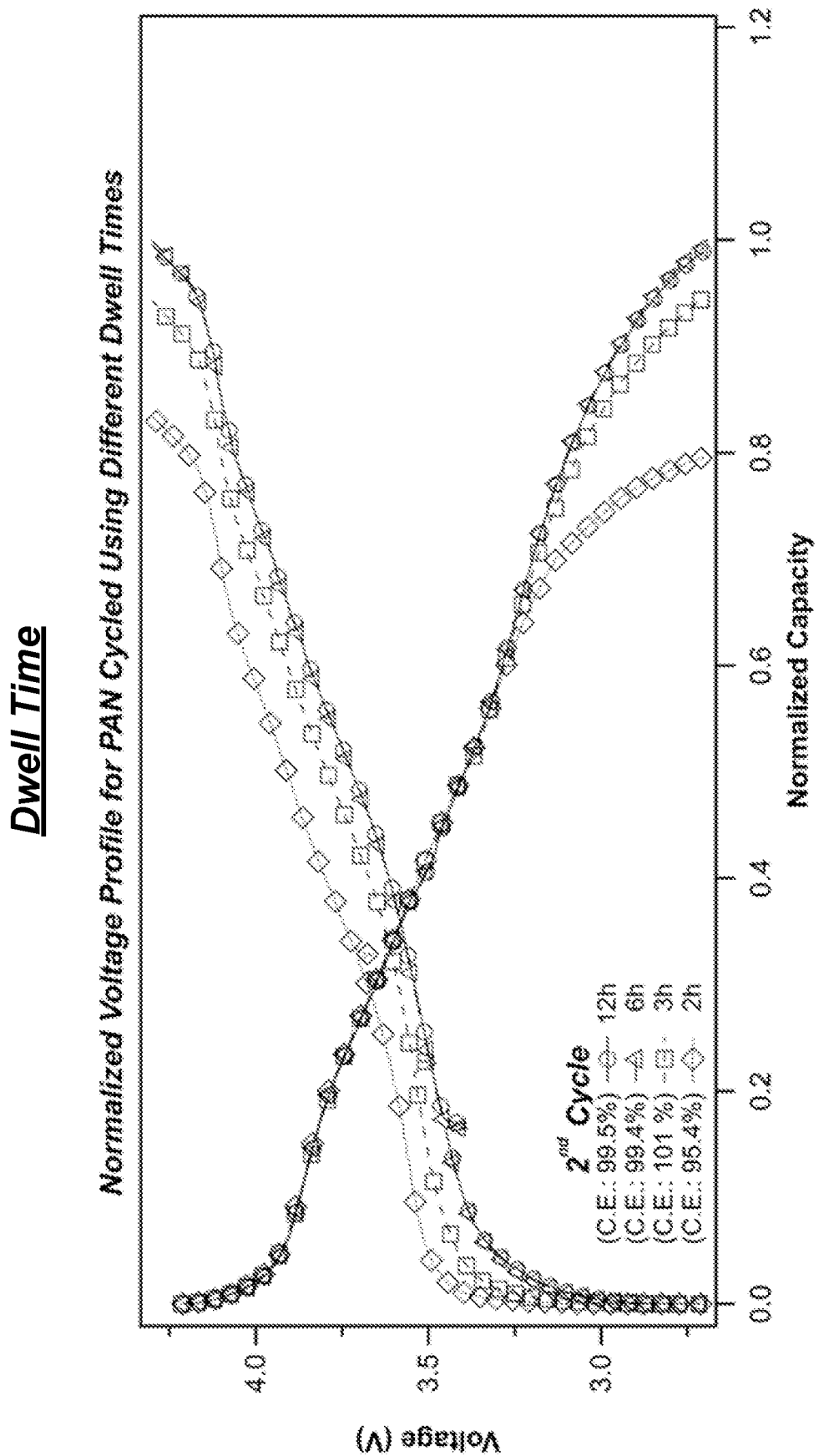
Figure 12:
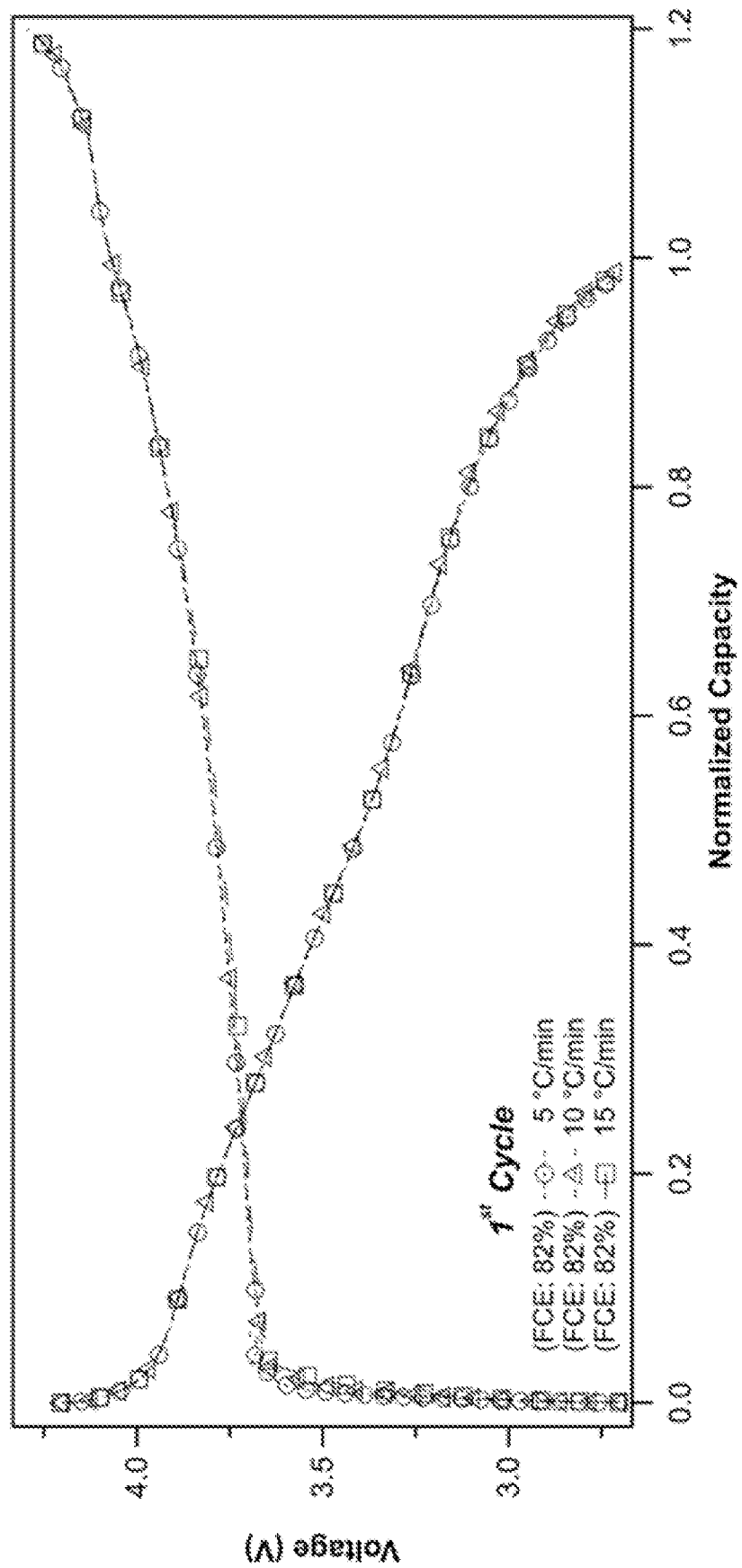
Figure 12:
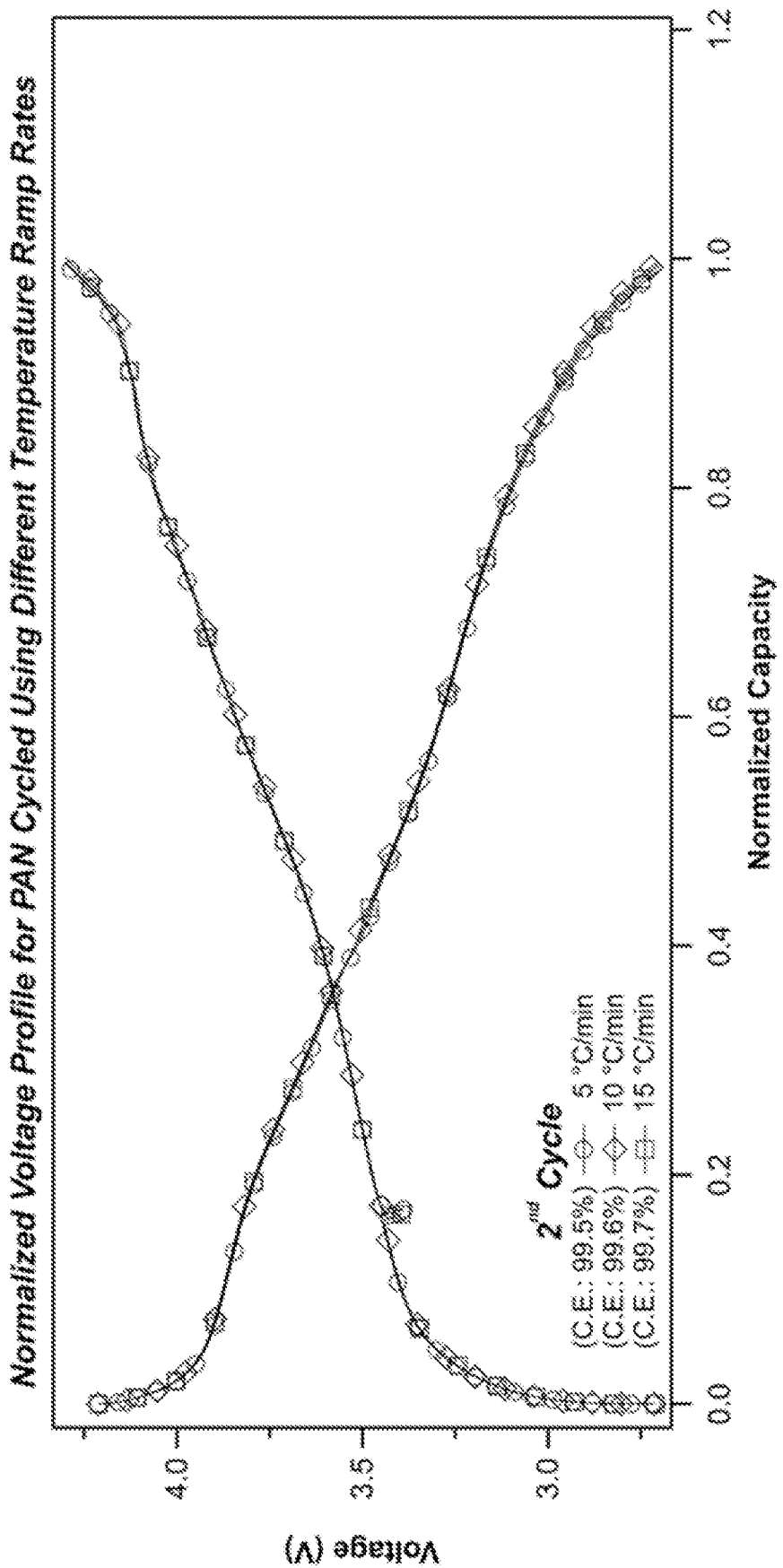

Of particular importance, especially as it relates to commercial scale manufacturing, is the finding that heating time and heat ramp rate should be tuned according to the anode microstructure and size. Specifically, anode thickness, PAN weight percentage, and the amount of anode material undergoing treatment affect these processing parameters. As represented in FIG. 12, heating times of just 2 hours can be sufficient for proper electrochemical performance.

Electrochemical Performance

Figure 13:
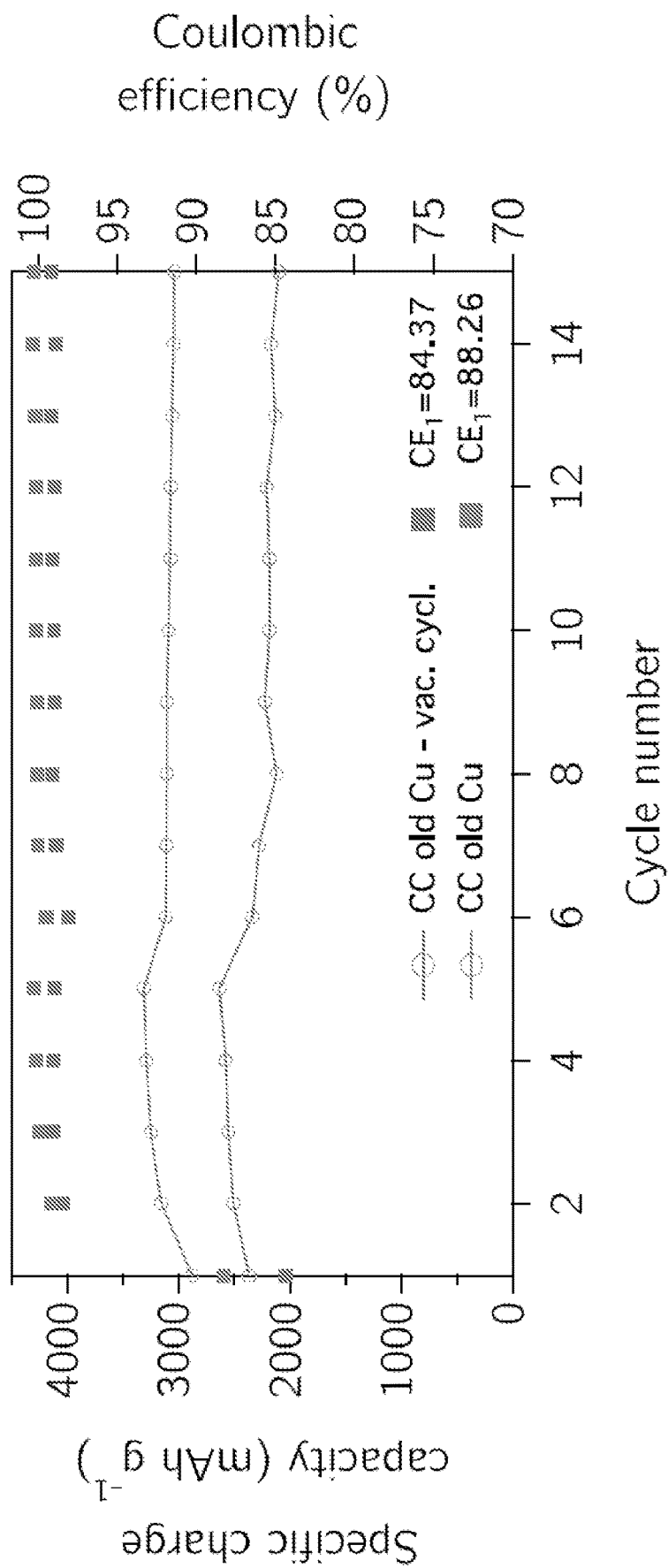
FIG. 13 is a graph illustrating exemplary half-cell containing a 30 to 35% silicon (normalized to total anode mass) anode produced by the methods described herein (6 mAh/cm$^2$ loading).
Figure 14:
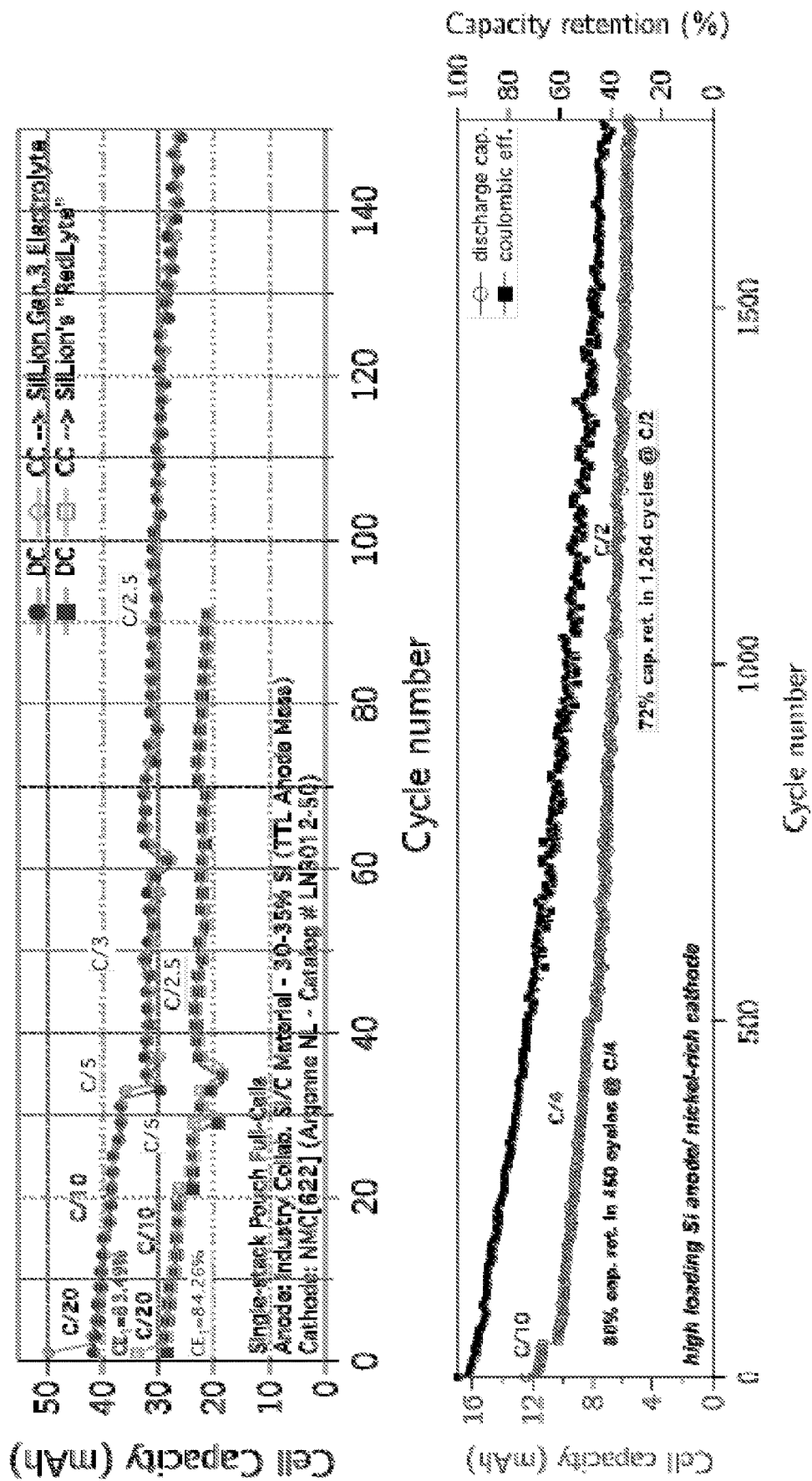
FIG. 14 is a pair of graphs illustrating full-cell single-stack pouches containing exemplary anodes as described herein, produced in large batches suitable for commercial-level performance (commercial mass loadings, commercially viable auxiliary components).

FIG. 13 presents exemplary data for a micron-Silicon:polyacrylonitrile (Si:PAN) anode half-cell fabricated through the methods described herein. The mass loadings, processing, and resulting composition of matter are sufficient for commercial use. FIG. 14 presents exemplary data for a full-cell comprising the exemplary anode described herein and a "nickel-rich" high-energy cathode ("NMC[622]").

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. An energy storage device comprising:
   a cathode;
   an electrolyte; and
   an anode comprising a film disposed over a current collector substrate, wherein the film has a thickness of 10 to 80 micrometers, wherein the current collector substrate has a surface roughness $R_z$ of greater than 1.5 micrometers, and wherein a magnitude of the arithmetical mean height Sa of the current collector substrate is less than three times a developed interfacial ratio Sdr of the current collector substrate, the film comprising:
   A) a plurality of active material particles, wherein the active material particles include at least one of silicon, hard-carbon, graphite, graphene, germanium, titanium oxide, tin, magnesium, antimony, and lead; and
   B) a conductive polymer membrane coating over the active material particles, the conductive polymer membrane coating comprising a thermoplastic polymer treated to become a cyclized, non-plastic ladder compound.

2. The energy storage device of claim 1, wherein the anode comprises 30-60 wt. % silicon particles and an areal gravimetric capacity of the anode is 1.3 to 1.6 times that of an areal gravimetric capacity of the cathode.

3. The energy storage device of claim 1, wherein the anode comprises greater than or equal to 60 wt. % silicon particles and an areal gravimetric capacity of the anode is 1.6 to 2.0 times that of an areal gravimetric capacity of the cathode.

4. The energy storage device of claim 1, wherein the thermoplastic polymer treated to become a cyclized, non-plastic ladder compound comprises polyacrylonitrile.

5. The energy storage device of claim 1, wherein the electrolyte comprises an imide-based room temperature ionic liquid.

6. The energy storage device of claim 1, wherein a porosity of the anode film is between 50-70%.

7. The energy storage device of claim 1, wherein the surface roughness $R_z$ is defined as the average of the peak-to-valley numbers in a given scan area of the anode film.

8. The energy storage device of claim 1, wherein the surface roughness L is greater than 6 micrometers.

9. The energy storage device of claim 1, wherein the cathode is a nickel manganese cobalt oxide cathode.

10. A method of making the energy storage device of claim 1, comprising:
  preparing an anode having a film with a thickness of 10 to 80 micrometers cast over a current collector substrate, the film comprising a plurality of active material particles and a thermoplastic polymer treated to become a cyclized, non-plastic ladder compound, the method of preparing the anode comprising:
    A) preparing a slurry having a Brookfield viscosity of 2000-6000 cP at 20 to 100 RPM using a #64 spindle, at room temperature, by placing a mixture of active material, additive powder and polymer powder in a solvent capable of dissolving the polymer powder;
    B) mixing the slurry for a time of 1 to 4 hours;
    C) casting the slurry over a current collector substrate;
    D) drying the casted film; and
    E) applying heat to the casted film at temperatures of 200 to 400° C. for a time of 1 to 12 hours; and
  combining the anode with a cathode and electrolyte to form the energy storage device.

11. The method of claim 10, wherein the active material includes at least one of silicon, hard-carbon, graphite, germanium, titanium oxide, tin, magnesium, antimony, and lead.

12. The method of claim 10, wherein the thermoplastic polymer treated to become a cyclized, non-plastic ladder compound comprises polyacrylonitrile.

13. The method of claim 10, wherein the additive powder comprises lithium metal powder.

14. The method of claim 10, wherein the additive powder comprises lithium nitride.

15. The method of claim 10, wherein the additive powder comprises oxalic acid.

16. The method of claim 10, wherein the application of 200 to 400° C. heat is completed under vacuum or inert gas flow.

17. The method of claim 10, wherein an areal gravimetric capacity of the anode is 1.3 to 2.0 times that of an areal gravimetric capacity of the cathode.

18. An energy storage device comprising:
  a cathode;
  an electrolyte;
  a current collector substrate having a surface roughness R, of greater than 1.5 micrometers, wherein a magnitude of the arithmetical mean height Sa of the current collector substrate is less than three times a developed interfacial ratio Sdr of the current collector substrate; and
  an anode film disposed over the current collector substrate, wherein the anode film has a thickness of 10 to 80 micrometers, and wherein a porosity of the anode film is between 50-70%, the anode film comprising:
    A) a plurality of silicon active material particles; and
    B) a polyacrylonitrile membrane disposed over the active material particles.

19. The energy storage device of claim 18, wherein the cathode comprises a nickel manganese cobalt oxide cathode.

* * * * *